United States Patent
Fung

(10) Patent No.: US 9,069,102 B2
(45) Date of Patent: Jun. 30, 2015

(54) SCALABLE SIMULATION OF MULTIPHASE FLOW IN A FRACTURED SUBTERRANEAN RESERVOIR WITH MULTIPLE INTERACTING CONTINUA BY MATRIX SOLUTION

(71) Applicant: Saudi Arabian Oil Company, Dhahran (SA)

(72) Inventor: Larry S. K. Fung, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 126 days.

(21) Appl. No.: 14/048,301

(22) Filed: Oct. 8, 2013

(65) Prior Publication Data
US 2014/0039853 A1    Feb. 6, 2014

Related U.S. Application Data

(63) Continuation of application No. 12/987,208, filed on Jan. 10, 2011, now Pat. No. 8,583,411.

(51) Int. Cl.
*G06G 7/48* (2006.01)
*G01V 99/00* (2009.01)
*E21B 49/00* (2006.01)

(52) U.S. Cl.
CPC .............. *G01V 99/005* (2013.01); *E21B 49/00* (2013.01); *G01V 99/00* (2013.01)

(58) Field of Classification Search
CPC ...................................................... G01V 99/005
USPC ............................................................ 703/10
See application file for complete search history.

(56) References Cited

U.S. PATENT DOCUMENTS

| | | | |
|---|---|---|---|
| 6,064,944 A | 5/2000 | Darda | |
| 6,842,725 B1 | 1/2005 | Sarda | |
| 7,596,480 B2 | 9/2009 | Fung | |
| 8,386,227 B2 | 2/2013 | Fung et al. | |
| 2006/0015310 A1 | 1/2006 | Husen | |
| 2008/0133186 A1 | 6/2008 | Li | |
| 2009/0119082 A1 | 5/2009 | Fitzpatrick | |
| 2010/0217574 A1 | 8/2010 | Usadi et al. | |

OTHER PUBLICATIONS

Al-Shaalan et al., "A Scalable Massively Parallel Dual-Porosity Dual Permeability Simulator for Fractured Reservoirs with Super-K Permeability", SPE Paper 84371, Oct. 2003, 7pp.

(Continued)

*Primary Examiner* — Hugh Jones
(74) *Attorney, Agent, or Firm* — Bracewell & Giuliani LLP; Constance G. Rhebergen; Albert B. Kimball, Jr.

(57) ABSTRACT

A subterranean reservoir where the pore space of media or formation rock is multimodal, and the media may have imbedded multiple scales of fracture networks, is simulated. The modes of the pore system and the scale of fracture networks are each represented as a separate, but interactive continuum with the other. A matrix solution with arrangement of the reservoir data adapted for parallel computation is utilized. The simulation allows multiple continua to be co-located and multi-interacting, in that each continuum may have current and counter-current multiple multiphase exchanges with other continua.

35 Claims, 15 Drawing Sheets

(56) References Cited

OTHER PUBLICATIONS

Barua et al., "Improving the Performance of Parallel (and Serial) Reservoir Simulators", Symposium on Reservoir Simulation in Houston Texas, Feb. 1989, pp. 7-18, Society of Petroleum Engineers 18408.

Clerke et al., "Application of Thomeer Hyperbolas to decode the pore systems, facies and reservoir properties of the Upper Jurassic Arab D Limestone, Ghawar field, Saudi Arabia: Rosetta Stone approach", GeoArabia, vol. 13, No. 4, 2008, pp. 113-160.

Dogru et al., "A Massively Parallel Reservoir Simulator for Large Scale Reservoir Simulation", SPE Reservoir Simulation Symposium held in Houston Texas, Feb. 1999, pp. 1-28, Society of Petroleum Engineers 51886.

Dogru et al., A Next-Generation Parallel Reservoir Simulator for Giant Reservoirs, 2009 SPE Reservoir Simulation Symposium, No. SPE 119272, Feb. 2, 2009, pp. 1-29.

Dogru et al., "A Parallel Reservoir Simulator for Large-Scale Reservoir Simulation", Reservoir Evaluation & Engineering, Feb. 2002, pp. 11-23, Society of Petroleum Engineers.

Fung et al., "Distributed Unstructured Grid Infrastructure for Complex Reservoir Simulation", European/EAGE Annual Conference and Exhibition held in Rome, Jun. 2008, pp. 1-9, Society of Petroleum Engineers 113906.

Fung et al., Parallel Iterative Solver for the Dual Porosity Dual Permeability System in Fractured Reservoir Simulation, IPTC paper 10343, Nov. 2005, 7pp.

Fung, "An Evaluation of the Improved Dual Porosity Model for the Simulation of Gravity Effects in Naturally Fractured Reservoirs", Journal of Canadian Petroleum Technology, May-Jun. 1991, vol. 30, No. 3 pp. 61-68.

Fung, "Numerical Simulation of Naturally Fractured Reservoirs" SPE paper 25616, Apr. 1993, 19pp.

Fung, Simulation of Block-to-Block Processes in Naturally Fractured Reservoirs, SPE Reservoir Engineering, Nov. 1991, pp. 477-484.

Lemonnier et al., Simulation of Naturally Fractured Reservoirs, State of the Art, Oil & Gas Science and Technology—Institut Francais Du Petrole, vol. 65, No. 2, Mar. 1, 2010, pp. 239-262.

PCT/US12/20708 Search Report and Written Opinion mailed Nov. 7, 2012, 11 pages.

Vinsome et al., "Orthomin, an Iterative Method for Solving Sparse Sets of Simultaneous Linear Equations", 4th Symposium of Numerical Simulation of Reservoir Performance of the Society of Petroleum Engineers of AIME, Feb. 1976, pp. 149-153, SPE 5729.

Yousef Saad, "GMRES", Iterative Methods for Sparse Linear Systems, 2003, pp. 171-194, Second Edition, Society for Industrial and Applied Mathmatics.

FIG. 3A
FRACTURED POROUS MEDIUM
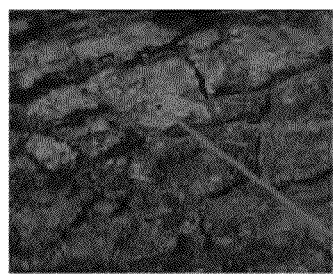
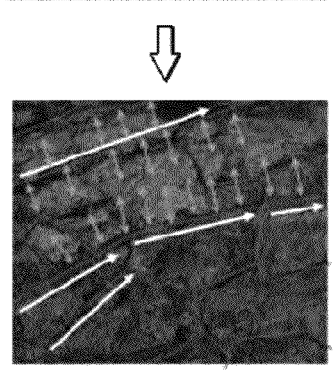
FIG. 3B
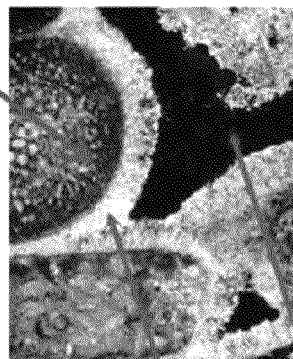
MULTI-MODAL POROSITY
30  32
FIG. 3C
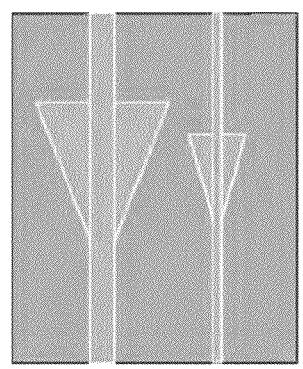
POROSITY PARTITIONS
FIG. 3D

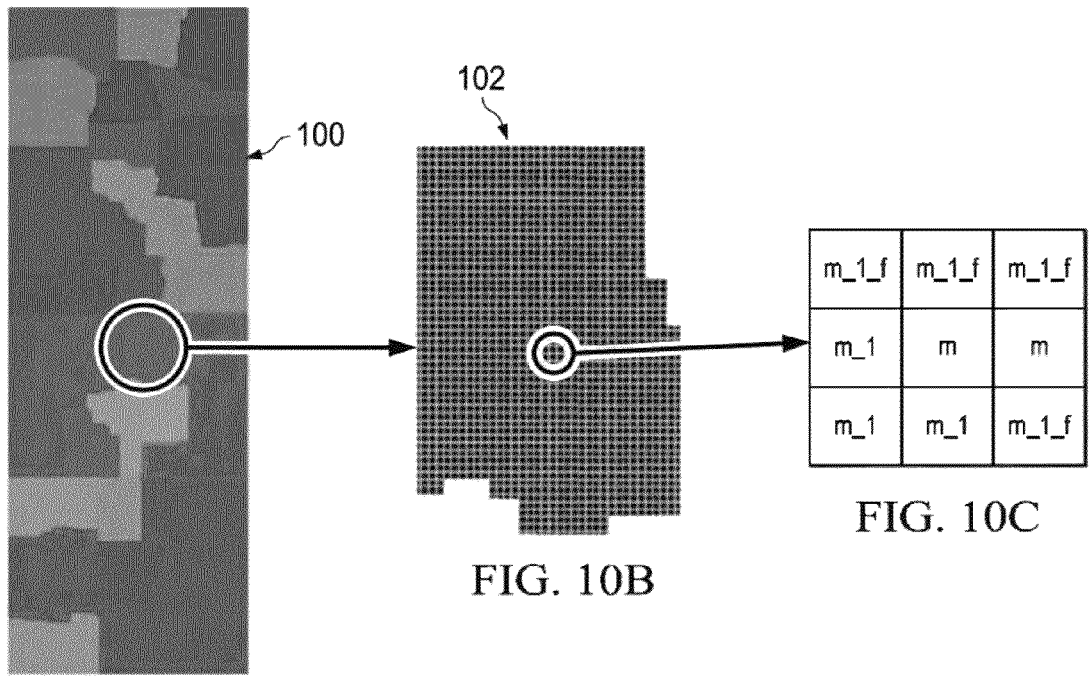
FIG. 10A
FIG. 10B
FIG. 10C
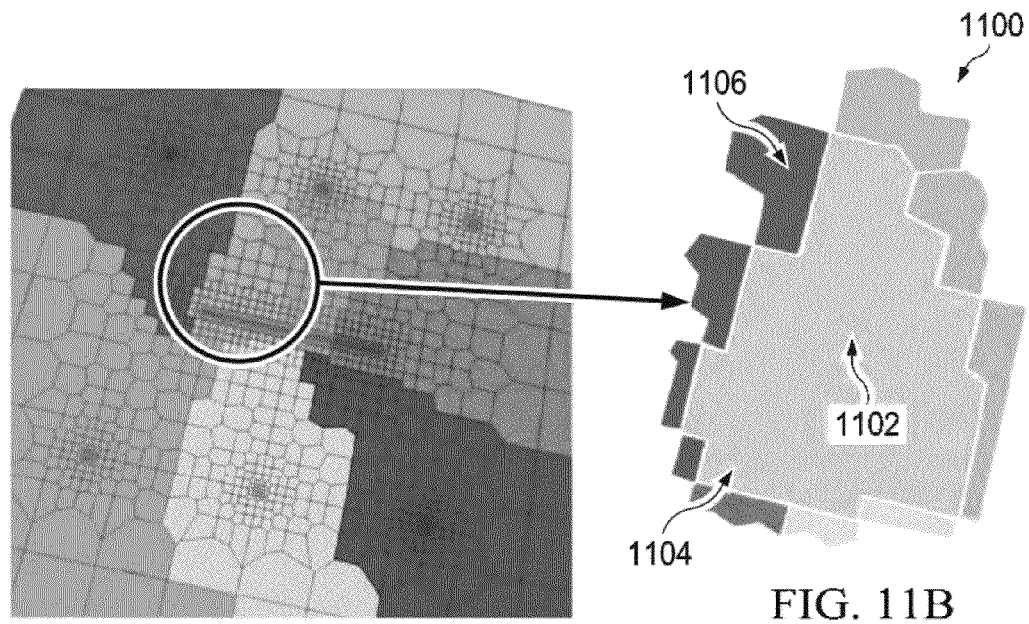
FIG. 11A
FIG. 11B

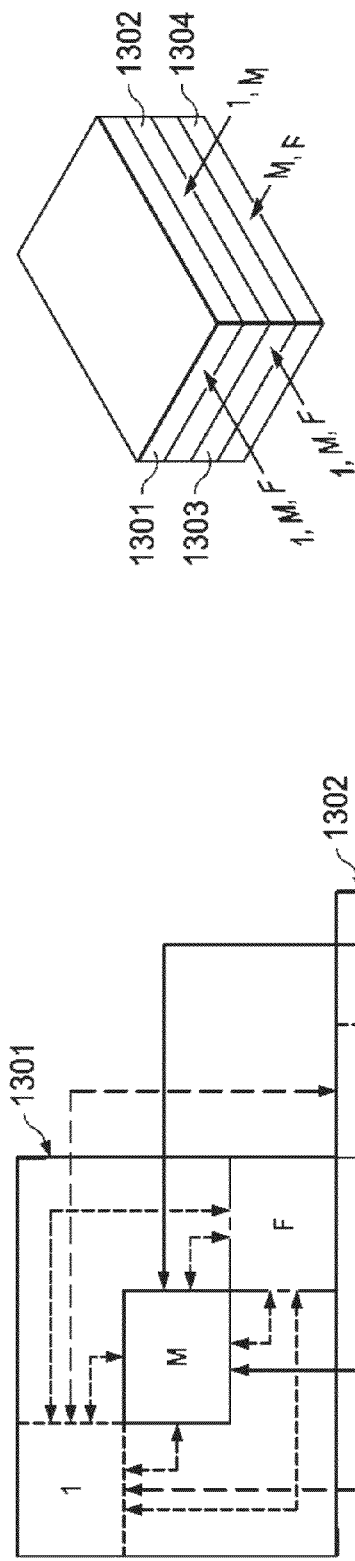
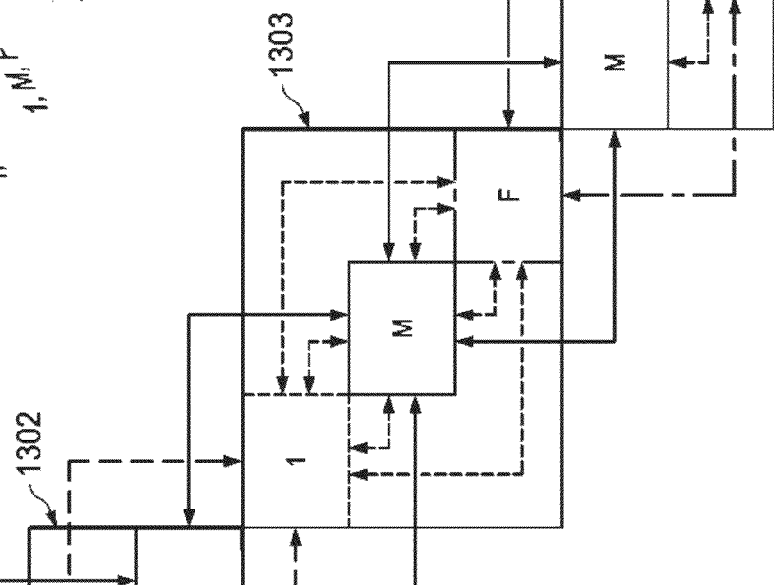
FIG. 13A
FIG. 13B
FIG. 13C

SCALABLE SIMULATION OF MULTIPHASE FLOW IN A FRACTURED SUBTERRANEAN RESERVOIR WITH MULTIPLE INTERACTING CONTINUA BY MATRIX SOLUTION

CROSS-REFERENCE TO RELATED APPLICATIONS

The present application is a continuation of, and claims priority to, co-pending, commonly owned U.S. patent application Ser. No. 12/987,208, filed Jan. 10, 2011.

BACKGROUND OF THE INVENTION

1. Field of the Invention

The present invention relates to computerized simulation of hydrocarbon reservoirs, and in particular to simulation of fluid flow in a complex heterogeneous subterranean reservoir where multiple interacting formation phenomena may be present, such as multimodal porosity or multi-scale fracture networks with spatially variable fluid transmissibilities.

2. Description of the Related Art

Many fluid-bearing subterranean reservoirs are naturally fractured. Interconnected fracture networks can have significant impact on the flow and transport phenomena within the porous medium. The use of dual porosity (DP) approach in reservoir simulation to represent fractured media has been in use in the petroleum industry since the mid-1970s. The basic concept of this approach can be schematically illustrated as in FIG. 1. FIG. 1 is a schematic diagram of such a dual porosity approach for fluid flow simulation in a naturally fractured reservoir which has vugs and fractures, as indicated at 10 and 12; respectively.

In this approach, the network of interconnected fractures was represented as grid cells 14 in the fracture continuum. The volume and inter-cell transmissibilities for the fracture cells are characterized to be representative of the fracture network. A collocated system of grid cells 14 known as a matrix 16 was used to represent the storage and transmissibilities of the intergranular pore space, also referred to as the matrix continuum. Since fracture transmissibilities are usually orders of magnitudes large than those of the matrix, early DP modeling considered the matrix grid cells as discontinuous and the cells were treated as sources or sinks to the fracture system. That is, for a DP model, a matrix cell had fluid exchanges with the collocated fracture cells, but the matrix inter-cell flow terms were considered to be small and negligible. To correctly describe the flow potentials between matrix and fracture, elaborate treatments of gravity, capillary, and viscous potentials usually had to be included in the matrix-fracture flow terms.

Later, as computer speed and memory increased, the dual permeability generalization was added where both the matrix system and the fracture system were considered to have through flow in addition to the local inter-porosity fluid exchanges. This class of model was referred to as dual-porosity dual-permeability (DPDP) model. However, there were sometimes extreme contrasts in porosity and permeability and rock-fluid properties such as different wettability, interfacial tension, relative permeabilities, capillary pressures, and fluid phase densities of the multiphase multicomponent fluid flow. Due to this, the dual-continuum model typically proved to be very challenging to solve numerically.

Further description of the DP and DPDP models can be found in articles which Applicant authored or co-authored in the literature: Larry S. K. Fung, "Numerical Simulation of Naturally Fractured Reservoirs" SPE (Society of Petroleum Engineers) paper 25616, April, 1993; Larry S. K. Fung, "Simulation of Block-to-Block Processes in Naturally Fractured Reservoirs" SPE Reservoir Engineering, November 1991, pp 477-484; and Larry S. K. Fung, David A. Collins, "An Evaluation of the Improved Dual Porosity Model for the Simulation of Gravity Effects in Naturally Fractured Reservoirs" Journal of Canadian Petroleum Technology, May-June 1991, Vol. 30, No. 3, pp 61-68.

In the mid-1990s, high performance computing using multi-processor parallel computers was increasingly applied to reservoir simulation. By the early 2000s, parallel dual-porosity dual-permeability reservoir simulation had emerged with methodologies primarily targeting structured grid, structured domain partitioning schemes, and structured solvers. The methods and algorithms in this simulator were described in: Tareq M. Al-Shaalan, Larry S. K. Fung, and Ali H. Dogru, "A Scalable Massively Parallel Dual-Porosity Dual Permeability Simulator for Fractured Reservoirs with Super-K Permeability" SPE Paper 84371, October 2003; and Larry S. K. Fung, Tareq M. Al-Shaalan, Parallel Iterative Solver for the Dual Porosity Dual Permeability System in Fractured Reservoir Simulation, International Petroleum Technology Conference (IPTC) Paper 10343, November 2005.

The DPDP simulator and associated solver method used in high performance computing of the types described above performed parallel simulation of fractured reservoir models which had millions of grid cells. However, so far as is known, the efforts were limited to structured grids and structured data partitions which were not optimal, particularly when a significant numbers of fracture cells were what are known as null cells. Null cells are finite volumes within the solution domain where the porosity and/or permeability are effectively zero.

Recent petrophysical analyses as well as core laboratory measurements have indicated that pore structures of many giant hydrocarbon-bearing carbonate reservoirs are complex and should be characterized as multi-modal. FIG. 2 illustrates the results of mercury injection capillary pressure (MICP) laboratory experiments on carbonate reservoir core samples. These data show pore structure which is characterized as multi-modal. More details can be found, for example, in: Ed Clerke, et al., "Application of Thomeer Hyperbolas to decode the pore systems, facies and reservoir properties of the Upper Jurassic Arab D Limestone, Ghawar field, Saudi Arabia: A Rosetta Stone Approach" GeoArabia, Vol, 13, No. 4, 2008, pp 113-160.

The multi-modal pore system of these media indicates that lumping of all pore space within a grid cell into a homogeneous value of porosity and permeability is inadequate. At the same time, the fracture system can also be complex and multi-scale. For example, the fracture system can have several scales of fractures: micro, macro, and mega scale fracture sets.

SUMMARY OF THE INVENTION

Briefly, the present invention provides a new and improved computer implemented method, with processors operating in parallel, of simulation of multiphase flow of fluids in a subterranean reservoir organized into a grid of reservoir cells. The reservoir cells have multiple interacting continua in which the multiphase fluid flow takes place. With the present invention, the reservoir is partitioned according to the presence of collocated interacting continua in the reservoir. The collocated interacting continua of the partitioned reservoir cells have flow interchange with continua of adjacent reservoir cells. A global cell number of a global cell domain is assigned to the reservoir cells where the continua are present, and the global cell domain is partitioned into a number of parallel data subdomains according to the number of processors operating in parallel. A local cell index is assigned to the cells of the parallel data subdomains to form simulation subdomains, and cells for the simulation subdomains are organized into interior cells, boundary cells and halo cells. The subdomain-to-subdomain connectivities of the simulation subdomains are represented as a dual level distribution. Inter-continua transmissibilities and intra-continua transmissibilities are determined for the active cells of the continua. A fully-coupled set of constraint equations to determine multiphase fluid flow is solved simultaneously in the processors assigned the parallel data subdomains for the active cells of the simulation subdomains, and the solution of fully coupled nonlinear set of constraint equations is linearized.

The present invention further provides a new and improved data processing system for computerized simulation of multiphase flow of fluids in a subterranean reservoir organized into a grid of reservoir cells, where the reservoir cells have multiple interacting continua in which the multiphase fluid flow takes place. The data processing system includes a processor for performing the steps of partitioning the reservoir according to the presence of collocated interacting continua in the reservoir, where the collocated interacting continua of the partitioned reservoir cells having flow interchange with continua of adjacent reservoir cells. The processor also assigns a global cell number of a global cell domain to the reservoir cells where the continua are present and partitions the global cell domain into a number of parallel data subdomains according to the number of processors operating in parallel. The processor transfers the parallel data subdomains to a plurality of computer nodes of the data processing system. The computer nodes operate in parallel to simulate multiphase flow of fluids in the subterranean reservoir by assigning a local cell index to the cells of the received portion of partitioned data subdomains to form simulation subdomains and organizing the cells for the simulation subdomain into interior cells, boundary cells and halo cells. The computer nodes also represent the subdomain-to-subdomain connectivities of the simulation subdomain as a dual level distribution and determine inter-continua transmissibilities and intra-continua transmissibilities for the active cells of the continua in the simulation subdomain. The computer nodes also simultaneously solve a fully-coupled set of constraint equations for the simulation subdomain to determine multiphase fluid flow for the active cells of the simulation subdomain and linearize the solution of fully coupled nonlinear set of constraint equations.

The present invention further provides a new and improved data storage device which has stored in a non-transitory computer readable medium computer operable instructions for causing a processor to simulate multiphase flow of fluids in a subterranean reservoir organized into a grid of reservoir cells, where the reservoir cells having multiple interacting continua in which the multiphase fluid flow takes place. The instructions stored in the data storage device cause the processor to partition the reservoir according to the presence of collocated interacting continua in the reservoir, with the collocated interacting continua of the partitioned reservoir cells having flow interchange with continua of adjacent reservoir cells. The instructions also cause the processor to assign a global cell number of a global cell domain to the reservoir cells where the continua are present and partition the global cell domain into a number of parallel data subdomains. The instructions also cause the processor to transfer the parallel data subdomains to a plurality of computer nodes operating in parallel for processing the parallel data subdomains to simulate multiphase flow of fluids in the subterranean reservoir.

The present invention further provides a new and improved data storage device having stored in a computer readable medium computer operable instructions for causing a computer node to simulate multiphase flow of fluids in a subterranean reservoir organized into a grid of reservoir cells, where the reservoir cells having multiple interacting continua in which the multiphase fluid flow takes place. The instructions stored in the data storage device cause the computer node to receive a data subdomain partitioned from a global cell domain assigned to the reservoir cells where the collocated interacting continua are present, with the cells of the data subdomain being assigned a local cell index, the cells of the received data subdomain having collocated interacting continua, and the collocated interacting continua of the partitioned reservoir cells having flow interchange with continua of adjacent reservoir cells. The instructions cause the computer node to organize the cells for the simulation subdomain into interior cells, boundary cells and halo cells, and represent the subdomain-to-subdomain connectivities of the simulation subdomain as a dual level distribution. The instructions cause the computer node to determine inter-continua transmissibilities and intra-continua transmissibilities for the active cells of the continua in the simulation subdomain and solve simultaneously for the simulation subdomain a fully-coupled set of constraint equations to determine multiphase fluid flow for the active cells of the simulation subdomain. The instructions also cause the computer node to linearize the solution of fully coupled nonlinear set of constraint equations.

BRIEF DESCRIPTION OF THE DRAWINGS

FIGS. 3A and 3B are images from photographs of a reservoir grid cell containing a bimodal porous medium which is fractured.

FIG. 3C is a micro CT scan of a thin section of the core sample of FIG. 3A showing carbonate grains.

FIG. 3D is a schematic diagram of the core sample of FIG. 3A representing the bimodal pore system as a dual porosity rock.

FIG. 10A is a schematic diagram data of the unstructured partitions on a single horizon of a single continuum due to non-uniform weights.

FIG. 10B is a schematic diagram of the structured mesh of a subdomain in the horizon of FIG. 10A.

FIG. 10C is a schematic diagram of the structured mesh of the subdomain of FIG. 8B.

FIGS. 11A and 11B are schematic diagrams of subdomain partitions for a subdomain with its own multiple intersecting continua (MIC) cells and ghost or halo cells belonging to neighboring subdomains.

FIG. 13A is a schematic diagram of a column of grid cells with a variable multi-continuum system according to the present invention.

FIG. 13B is a schematic diagram of the interporosity exchange pattern for the grid cells of FIG. 13A.

FIG. 13C is a schematic diagram of matrix organization for the grid cells of FIG. 13A organized for data processing operations according to the present invention.

DETAILED DESCRIPTION OF THE PREFERRED EMBODIMENTS

Figure 1:
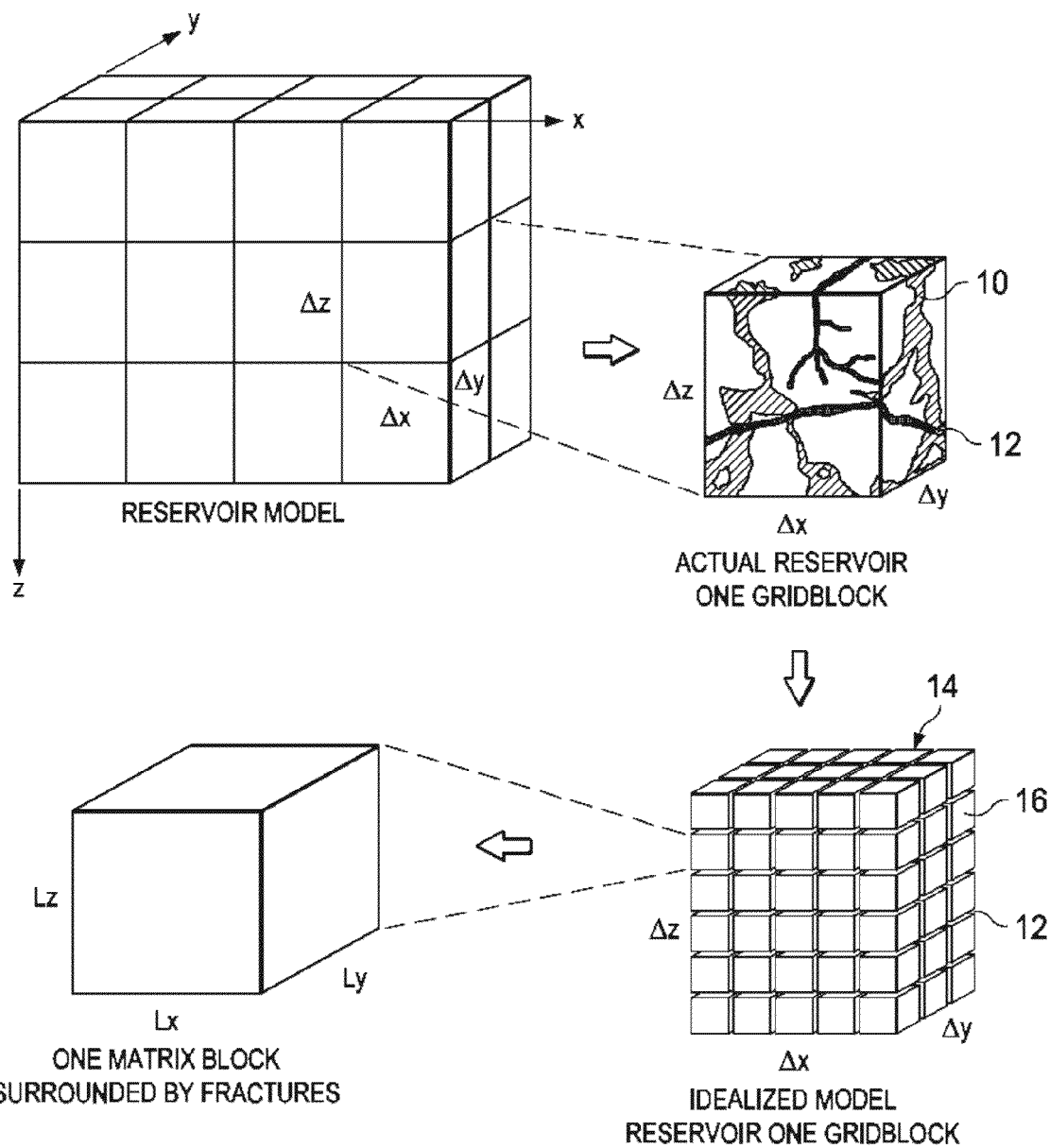
FIG. 1 is a schematic diagram of a prior art dual porosity modeling technique for fluid flow simulation in a naturally fractured reservoir.

By way of introduction and for ease of reference, certain acronyms are used for brevity of reference to certain terminology or nomenclature in certain portions of the description. The acronyms and their meanings are provided below:
DP—Dual porosity
DPDP—Dual porosity dual permeability
HPC—High performance computing
MIC—Multiple interacting continua
MICP—Mercury injection capillary pressure experiment
MPI—Massage passing interface
MPMP—Multi-porosity multi-permeability
SPSP—Single porosity single permeability The present invention provides a scalable parallel simulation system for simulating the general multiphase multicomponent fluid flow in a subterranean porous medium which is characterized as a multi-continuum (multi-porosity multi-permeability, or MPMP). The multi-continuum medium can have multi-modal matrix porosities as well as multi-scale interconnect fracture networks. With the present invention, a partitioning of the pore spaces into a multi-porosity system, each with a distinct set of rock and rock-fluid interaction properties is performed.

According to the present invention, a parallel numerical simulation is performed of fluid flow in a fractured subterranean reservoir where the pore space has been characterized as a multi-continuum. The reservoir being simulated is typically complex and heterogeneous, and is one determined to be multimodal. Multimodal phenomena typically arise in limestone where a micro CT scan of thin sections and mercury injection capillary pressure (MICP) clearly indicate the morphology of the pore system as containing multimodal porosity with macro pores and micro pores. In such cases, the microscopic displacement efficiency and wettability of the pore system can have significant implications in the multiphase displacement of wetting phase by non-wetting phase and vice versa. At the same time, the medium can also have imbedded multiple scales of fracture networks.

The present invention models such a reservoir as multiple interacting continua. Each mode of the pore system and each scale of fracture networks are represented as a continuum. The multiple continua are collocated and multi-interacting, meaning each continuum can have co-current or counter-current multiphase fluid exchanges with each other continua. These are the inter-porosity or inter-continuum fluid flows, whereas within the same continuum, the intra-porosity fluid flows between neighboring finite volumes or grid cells are determined in the usual way.

The reservoir being simulated can have multi-modal porosity where the number of modes varies spatially from zero to several. The reservoir can also embed multi-scale fracture networks with spatially variable fluid transmissibilities. The multi-permeable multi-continuum characterization is well suited for field-scale simulation of sub-grid level multi-modal heterogeneous features in naturally occurring subterranean deposits where multiphase multicomponent fluid flow processes and transport phenomena take place.

According to the present invention, the multi-porosity multi-permeability (MPMP) system invention is a general multiple interacting continua (MIC) representation of a porous medium. The terms MPMP and MIC are used interchangeably according to the present invention, since they are each used to represent or refer to a porous medium which is highly heterogeneous and/or naturally fractured. In the MPMP or MIC system, the porosity heterogeneities are appropriately partitioned into multiple continua according to the significant differences in fluid transport properties, and wettability of the described pore system. The multi-continuum representation of the porous medium is naturally multiple interacting for the multiphase multicomponent flow processes within the cell. In the general case, the porous medium can also imbed multiple fracture networks of varying lengths, widths, and connectivities. The imbedded fractures may be a nested multi-scaled system of mega, macro, and micro fractures with length scales spanning over orders of magnitudes: in the tens of feet, 1 foot, and 0.1 foot, for examples.

These fracture systems can have widely varying flow properties, volumes, anisotropy, and interconnectivities. The isolated mega-fractures are at a scale where discrete fracture modeling can be applicable. A discrete fracture model uses multi-dimensional fracture grid cells to represent the fracture. The matrix grid cells surrounding the fracture grids are typically unstructured because the mega fractures can have complex geometry and directions. It is thus not possible to use structured grids to discretize the matrix spaces between the mega fracture networks, except for the synthetic idealized cases.

Figure 2:
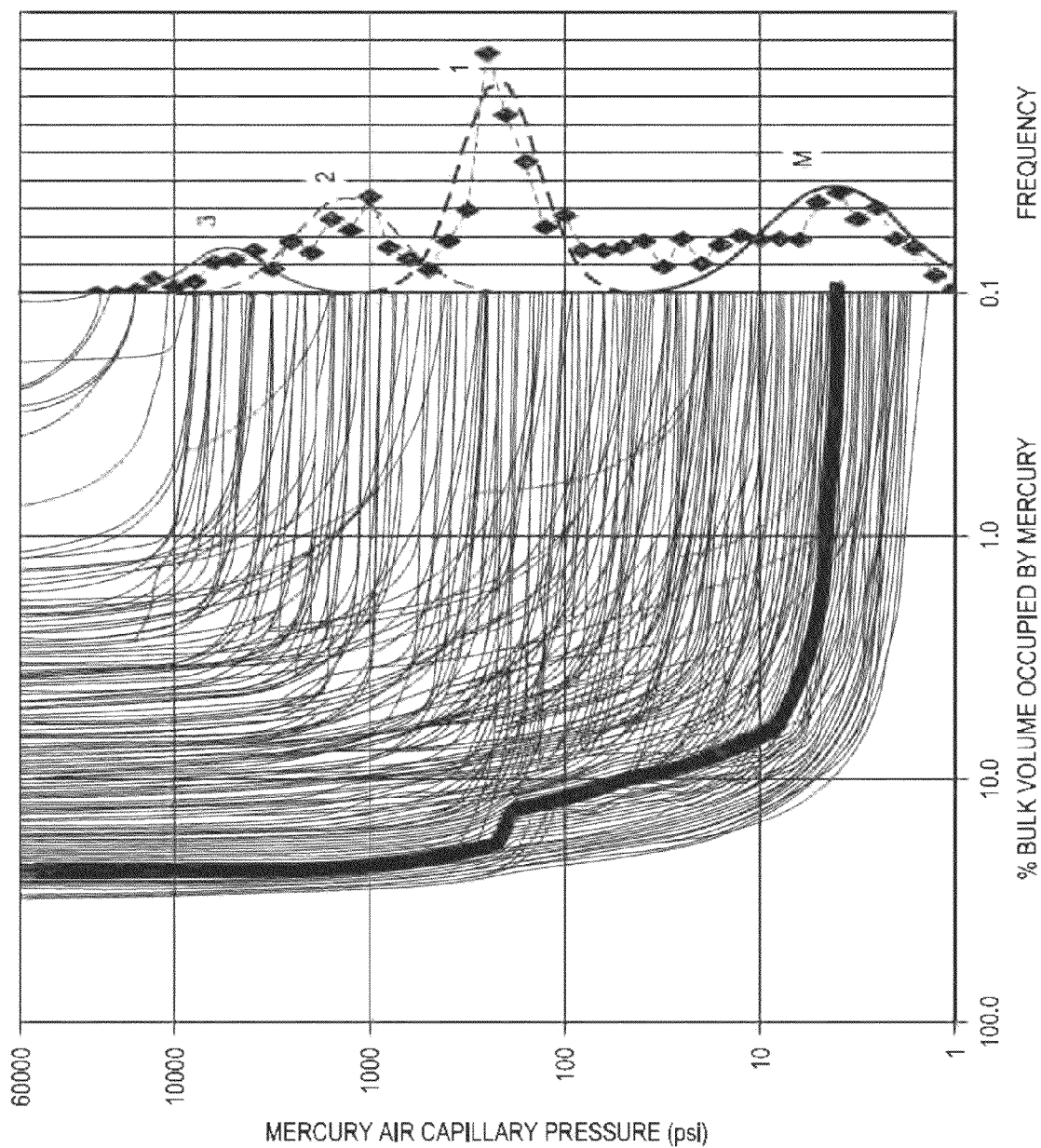
FIG. 2 is display of the results of a mercury injection capillary pressure experiment on carbonate core samples showing multi-modal porosity behavior of example reservoir rock core samples.

The morphology of a fracture system can be complicated and fracture swamps which frequently exist in nature are not easily susceptible to direct fracture gridding. The macro and micro scale fractures are too small and render direct gridding of these fractures in field-scale simulation impractical. As has been noted, the pore system in many carbonate reservoirs can be observed to be multi-modal. Referring again to FIG. 2, if one chooses to include the two most significant modes and discounts the others, then what is shown can be regarded as a bimodal system. A bimodal pore system takes the form of macropore type M and micropore type I with distinct dynamic reservoir properties and wettability. FIGS. 3A and 3B are images of photographs which illustrate a reservoir grid cell containing a bimodal porous medium which is fractured, thus having bimodal porosities and a fracture network. The arrows in FIG. 3B illustrate fluid flow directions along the fracture pathways and the fluid flow from the matrix into the fracture within the porous medium. FIG. 3C illustrates a micro CT scan of a thin section of a core sample with carbonate grains which clearly indicates both the macropore type M at 30 and micropore type I at 32 modes of pore spaces. FIG. 3D is a schematic diagram of the representation of the bimodal pore spaces, such as those of FIG. 3C. The heterogeneities in carbonate reservoir rock shown in FIGS. 3A, 3B and 3C are at the scale of the pore fabric itself and at length scales which are several orders of magnitude smaller than the typical length scale of a typical reservoir simulation grid block. For this reason, direct discretization for field-scale simulation is thus not viable.

The present invention provides a powerful and practical approach of using the MIC or MPMP approach for doing numerical simulation. The present invention is designed to have nearly ideal parallel performance in massively parallel applications. It is particularly useful in evaluating the complex interplay of gravity, capillary, and viscous forces in multiphase flow and transport for reservoirs described as MIC, which have highly varying rock types, wettability, and imbedding fracture networks.

The multi-continuum representation is variable at the grid cell level. That is, at each physical cell location, there can be a number from 0 to m number of collocated finite volumes where m is the number of continua, each representing either a matrix porosity mode or a fracture scale locally. When a physical location has no effective porosity and no fracture present, there is no active finite volume at that physical cell location.

To perform field-scale numerical simulation of these reservoirs, depending on their physical sizes, requires the use of tens of millions, or even over a billion grid cells. Thus, the reservoir simulation according to the present invention is performed in a computational configuration which is fully parallel and data distributed. The simulation is scalable and efficient from small-scale parallel implementation to massively parallel implementation.

As will be described, cell status is determined at runtime locally on N parallel processes and the generated simulation sub-domain partitions are load balanced in computation and memory use. The modeling capability of the present invention includes all previous single porosity (SP), dual porosity (DP), dual porosity dual permeability (DPDP) system as special cases.

Data Processing Methodology and System

Figure 4A:
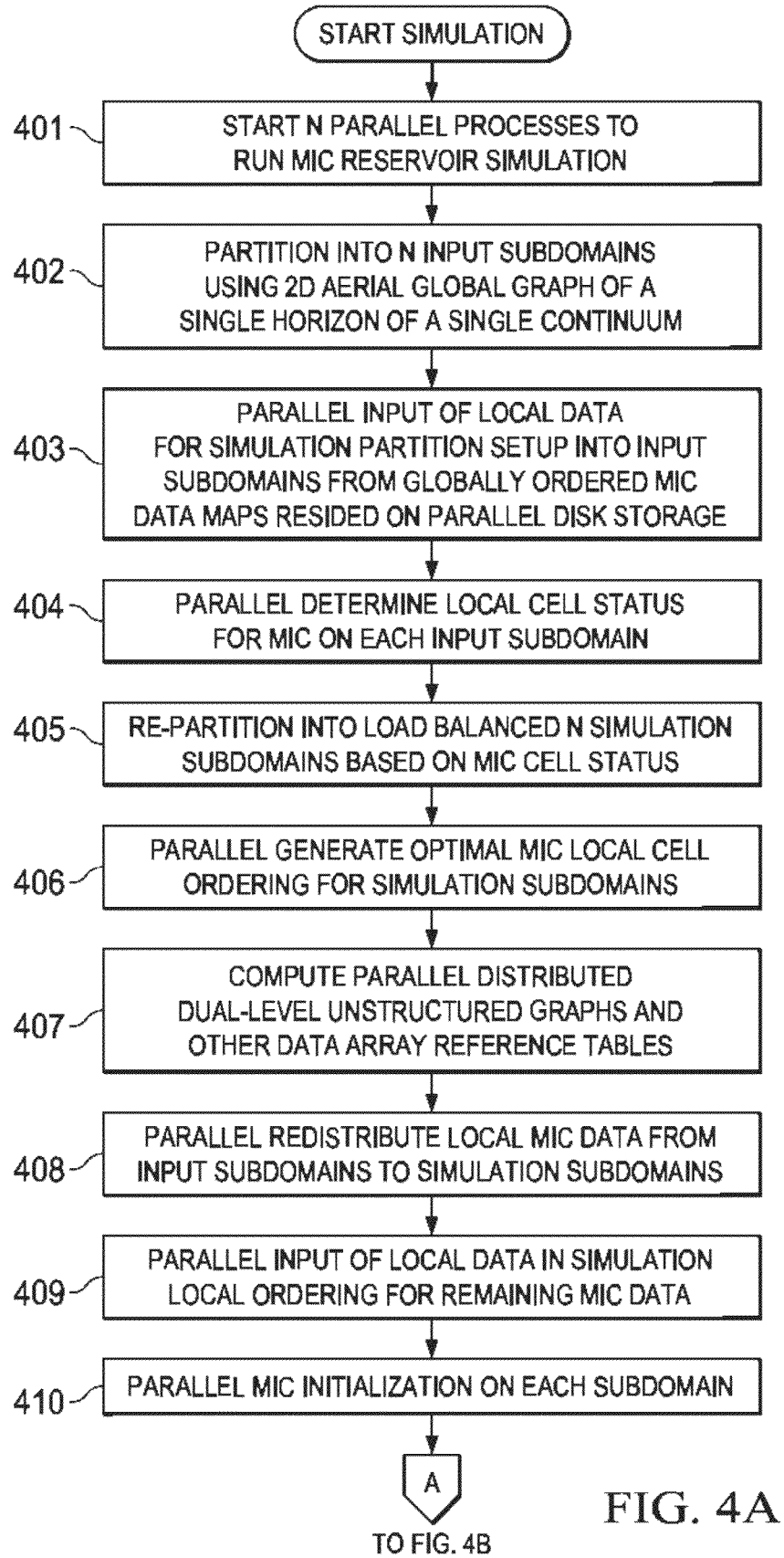
FIGS. 4A and 4B are functional block diagrams of a flow chart of data processing steps for a scalable parallel method and system for simulating multiphase flow and transport in a fractured subterranean reservoir according to the present invention.
Figure 4B:
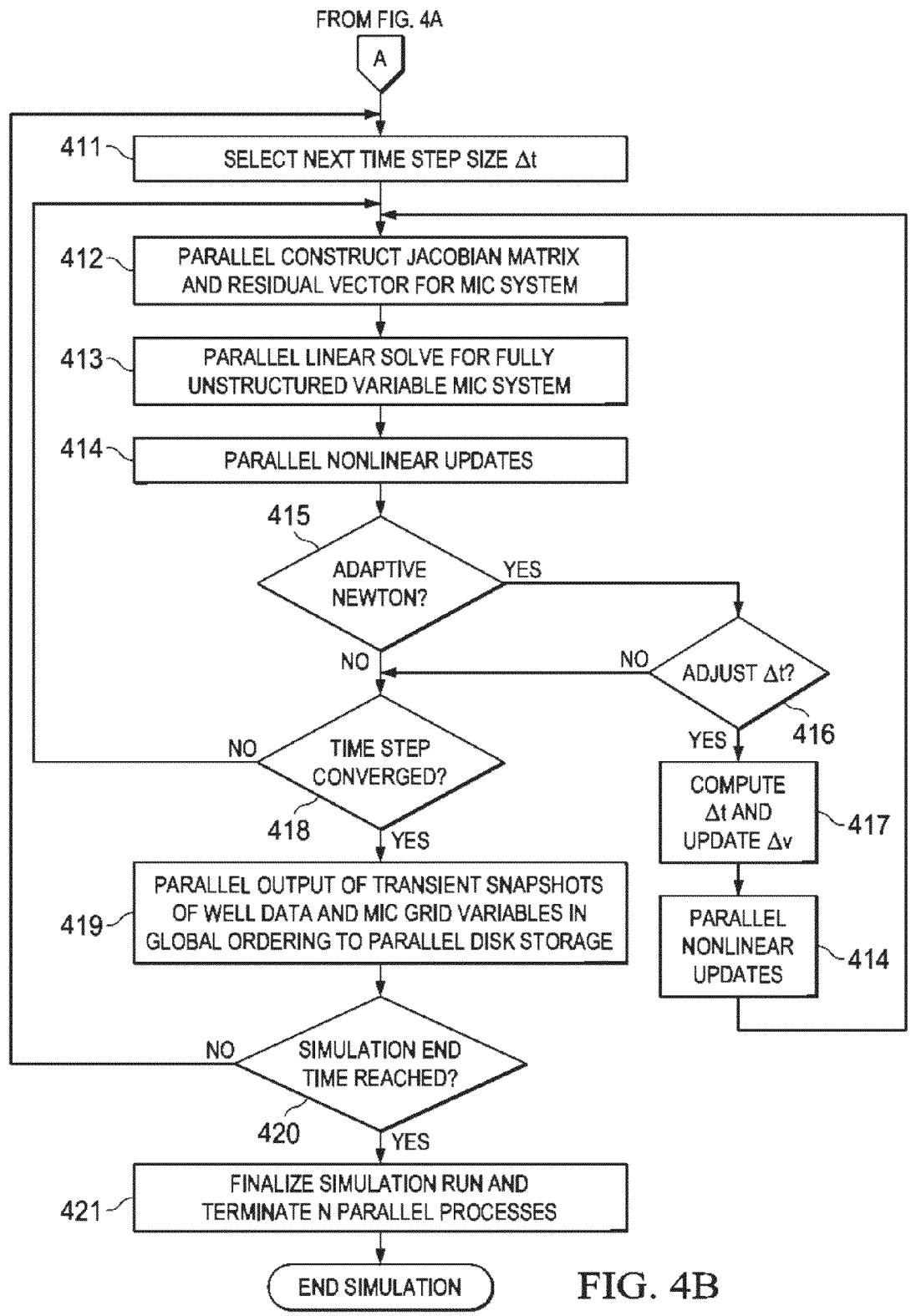

FIG. 4 illustrates a schematic system flow diagram according to the present invention for simulating multiphase flow and transport in a fractured subterranean reservoir having multiple interacting continua. The processing provided is a scalable parallel method and system, as will be set forth. The system and method steps are parallel methods with distributed data architecture described below and running on each process of a collective group of processors.

With reference to FIG. 4, the flow chart F is a high-level logic flowchart illustrates a method according to the present invention of multiphase flow and transport in a fractured subterranean reservoir having multiple interacting continua. The method of the present invention is performed in a data processing system D (FIGS. 5 and 6) and implemented utilizing the computer program steps of FIG. 4 stored in memory and executable by system processors of data processing system D as will be set forth. As shown in the flow chart F of FIG. 4, a preferred sequence of steps of a computer implemented method or process for simulating multiphase flow and transport in a fractured subterranean reservoir having multiple interacting continua is illustrated schematically.

The input data to processing system D include, among other data, the geocellular models which describe the reservoir properties such as porosity, permeability and rock facies types and other properties for a single or multiple continua and may include fracture description in the multi-porosity type description. Other data include fluid pressure, volume and temperature or PVT data, equilibrium initialization data, multiphase relative permeability and capillary pressure for each various rock type, well perforation data, production and injection schedules, as well as other well level, group level, and field level control and constraints.

For a simulation run involving N parallel processes, step 401 initializes N processes and read from storage parametric information about the simulation model. Step 402 partitions the entire reservoir grid into N partitions called subdomains. These are the input subdomains which are based on decomposing the 2D grid of a single horizon of a single continuum. Step 402 also builds the input subdomain local cell to global cell reference and dereferencing system input/output or IO processing of the geocellular model describing each of the MIC. It is to be noted that the reservoir grid can be any general finite volume grid such as a structured grid, an unstructured grid, or a hybrid grid.

Step 403 is the parallel method where each process individually reads its local cell data from data store which reside on parallel file servers. Only the data arrays needed for cell status identification and grid-graph manipulation are read in 403. The disk files containing the MIC geocellular model are conveniently stored in the form of globally ordered grid binary arrays, as will be set forth. This advantageously enables the same model to be run with N processes where N is simply an adjustable input parameter to the job scripts and no additional process or file space is needed.

In fractured MIC or MPMP reservoirs, a large fraction of cells may be dead cells. Step 404 identifies them based on user specified criteria and flags them for elimination from the cell list of the simulation domain. Step 405 uses the active cell list from 404 to repartition the global 3D grid into N simulation subdomains. The number of continua active at a node is used as the node weight during the repartition. The simulation subdomains contain active cells only from all continua and the partitions have optimally nearly equal numbers of active cells. The number of external boundary connections is also minimized in this process.

Step 406 performs simulation subdomain local cell reordering. The simulation domain cells are ordered to achieve optimal performance for the linear and nonlinear solver techniques to be performed. More details about this ordering strategy are explained below. Following reordering, the simulation subdomain local to global indexing system and its inverse are built. The inverse indexing locates the local cell index and the process ID from a global cell index. This inverse indexing system uses only local size arrays. This is important for large-scale simulation where the number of global grid cells can be in the billions and any global size indices would be inefficient and overwhelm the local memory of typical HPC compute node. In step 407, the distributed active-cell 3D connectivity graph is computed where the dead connections from the all-cell graph are removed.

Step 408 performs parallel redistribution and reordering of the local data which was inputted or computed based on the input subdomain partitions. During step 408 scatter-gather of local data from input subdomains to simulation subdomain is performed among the parallel processes. After step 408, all grid array data are in the simulation subdomain local ordering.

In step 409, each process does parallel input of all remaining MIC grid data based on the simulation domain local ordering established in step 406. Step 410 performs the MIC gravity capillary and other initialization tasks. Initialization satisfies variable multi-continua multi-rock-types multi-fluid on a per grid cell basis within each vertical column of grid cells. Each parallel subdomain contains a subset of columns. Each column of grid cells can contain cells from multiple interacting continua with different rock types and contains multiple fluid types. Additionally, it can also involve stacked reservoirs with multiple contacts involving multiple equilibrium regions. The present invention determines cell subsets for each equilibrium region to perform capillary-gravity equilibrium calculations. These initialize the pressure and fluid phase distribution for all active cells within the column such that the flow potential of each cell is in dynamic equilibrium with all its connected neighboring cells.

Step 411 is a time step selector which selects the next time-step size based on nominal changes of variables for a time step, while honoring other criteria which well schedules, reporting periods, etc.

The System Equations to be described below are nonlinear partial differential equations which are mixed hyperbolic-parabolic, and typically discretized during processing according to the present invention using a mass-conserving, finite-volume method. A generalized classical Newton's method is typically used to linearize the resulting discrete systems of equations. However, field-scale models typically involve highly heterogeneous porosities and permeability tensor fields.

This is compounded by the extreme contrast in these properties through the different scales of pore matrix and fracture networks. In addition, fluid PVT and rock-fluid functions can have complex nonlinearities which involve phase and component discontinuities in the multicomponent multiphase fluid flow system.

A classical Newton's method applied to fractured-matrix system can frequently have convergence problems and an excessive number of time-step cuts. A time-step cut occurs when Newton's method exhausted a specified number of iterations and failed to achieve convergence to the required material balance and/or change tolerances. In the present invention, an adaptive time-step Newton's method is developed.

The linearization follows an initial time step size selection. Due to the several orders of magnitude differences in porosities and permeability tensors of the fracture continua and the matrix continua, reservoir simulation involving multiple interacting continua can have significant convergence difficulties during some periods. The maximum stable and convergent time step size thus cannot be easily and cheaply predicted.

During difficult periods in the simulation when complex multiphase flow physics are developing, the initial time step selection may not be optimal and may need to be adjusted. In such a situation, an adaptive Newton procedure is instrumented and may be used to detect excessive variable changes and residual changes in the initial iterations. The time step size is then adjusted to stay within the convergence radius such that nonlinear convergence can be achieved in a reasonable number of nonlinear iterations and the occurrences of time step cuts are minimized.

Such an adaptive time-step Newton's method adjusts or adapts the time step size based on computed nonlinear residual updates and changes incurred during early stages of the Newton method iterations. The premise of the adaptive time-step method is that there is a convergence neighborhood at the present time beyond which the Newton's method may oscillate or diverge or not converge within a reasonable number of Newton's iterations. The adaptive time-step method makes preemptive adjustments to reduce the time step size when the nonlinear residual and change updates are bigger than the nominal thresholds. Steps 412, 413, 414, 415, 416, 417, and 418 are components of the adaptive Newton's (AN) iteration logics. The steps 412, 413, 414, and 418 are in effect the classical generalized classical Newton's method.

Step 412 constructs the Jacobian matrix and residual vector for the governing nonlinear discrete balance System Equations of the MIC system as described below. Step 413 is the linear solver method of the MIC system which is shown in more detail in FIGS. 12A and 12B and described in connection with these Figures. Step 414 is the nonlinear update method after the solution is determined during step 413.

Flow control step 415 decides whether the current iteration is an adaptive iteration. If it is, execution proceeds to step 416 which determines whether the current step size is acceptable based on threshold criteria on maximum changes and nonlinear residuals. The threshold criteria decide whether the current maximum norms of change and residual updates are likely to yield a convergent time step.

If a reduction in time step $\Delta t$ is required, it is determined during step 416. Step 417 reduces the solution updates for the reduced time step $\Delta t$ calculated in 416. Then, nonlinear update step 414a like that of step 414 is applied again before proceeding again to step 412 and the next nonlinear iteration. If no time step reduction is required during step 416, processing proceeds to step 418 for convergence checking.

At flow control step 415, if it is not an adaptive iteration, execution also proceeds to step 418 for convergence checking. If convergence is not achieved, processing returns to step 412. If convergence is achieved, processing may proceed to the next time step. If output is needed at the present time step, step 419 is a parallel result writer step wherein each process may output the transient snapshots of variables such as pressure and saturations for its own local cells to file server in global cell-ordered binary arrays. Step 420 checks to determine whether simulation end time has been reached. If not, step 420 returns control to the time step selector step 411. Steps 411 through 420 are the transient time-step loop. If during step 420, final simulation end date has been determined to be reached, step 421 performs the final result output, file closing, free memory, mop up, finalizes all processes, and terminates the run.

The system and method steps are preferably implemented in standard software languages FORTRAN/C/C++ with the MPI (http://www.mpi-forum.org/) standard for parallel communication protocol for distributed memory applications and with the OpenMP (http://openmp.org/wp/) API specification for multithreading within a single process.

The processing and method steps of FIG. 4 are suitable for deployment on a variety of today's HPC hardware. These are typically rack mounted hardware with several compute nodes which contains multiple CPUs with multi-core architecture. Nodes are interconnected with conventional low latency high bandwidth networks, switches, and routers.

The typical HPC environment for use with this simulation system is today's multi-node, multi-CPU, multi-core compute clusters. An example such cluster is illustrated at C in the data processing system D of FIG. 5. The cluster C is formed of a plurality of computer nodes 50 (FIGS. 5 and 6) which are provided with data in parallel as indicated by and arrow 52 by a router server or servers 54. If desired, several such router servers may be used for this purpose. Original simulation or input data of the types described above is stored in a suitable number of data storage/file servers 56. The router servers 54 under control of computer code 55 stored in memory transfer input simulation data in parallel from the storage servers 56, as well as simulation processing results as indicated by an arrow 58, to and from the computer nodes 50 of the cluster C. The program code 55 according to the present invention is in the form of non-transitory computer operable instructions causing the server or servers 54 to index, order and transfer the data. Typically, the data processing system D includes a set of work stations 57 of suitable, conventional type which are connected to the system by a network 59.

Figure 6:
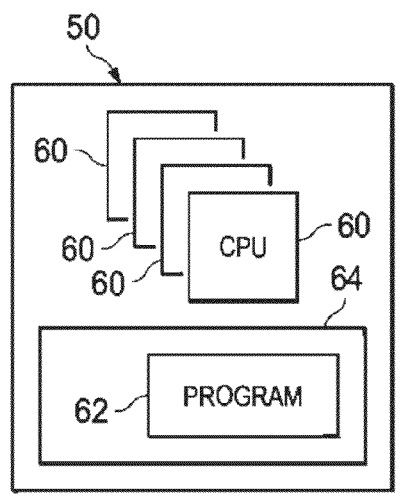
FIG. 6 is a schematic diagram of an application server or computer node of the computer network of FIG. 5.

The computer nodes 50 of the cluster C include a plurality of processors or cores 60 of the type illustrated in FIG. 6 operating in parallel under instructions of a computer code or program product 62 stored in stored in memory 64 of the computer nodes 50. The program code 62 according to the present invention is in the form of non-transitory computer operable instructions causing the data processors 60 to simulate fluid flow in a fractured subterranean reservoir where the pore space has been characterized as a multi-continuum.

It should be noted that program codes 55 and 62 may be in the form of microcode, programs, routines, or symbolic computer operable languages that provide a specific set of ordered operations that control the functioning of the data processing system D and direct its operation. The instructions of program codes 55 and 62 may be stored in memory of the servers 54 or processor nodes 50, or on computer diskette, magnetic tape, conventional hard disk drive, electronic read-only memory, optical storage device, or other appropriate data storage device having a non-transitory computer usable medium stored thereon. Program code 60 may also be contained on a data storage device such as server 56 as a computer readable medium, as shown.

RAM and cache memory are distributed and local to each compute node and are shared by the processing cores on each the node. The physics simulated by the system of the present invention is a tightly coupled, global multiphase flow problem which is both convective and diffusive in nature. A high bandwidth, low latency network is thus preferred to minimize inter-process communication overhead. The message passing interface (MPI) standard is used for inter-process communication operations while MPI-2 is used for parallel I/O operations. Disk storage for simulation or model data and processing output results are typically on centralized NAS, SAN, GPFS, or other parallel file systems. For smaller scale parallelism, local hard disk storage which resides on the cluster can also be used. Parallel distributed I/O methods are used to minimize read/write time from/to disk during simulation.

System Equations

With the present invention, it has been found that a detailed simulation requires multiple collocated fractured grids. Each of the multiple collocated fracture grids has associated with it different storage and flow characteristics and attendant inter-continuum fluid exchanges in order to correctly take into account the appropriate physics for accurate simulation of multiphase flow through complex and multi-scale fractures. Using finite-volume discretization for the nonlinear governing equations of the MIC or MPMP system, the porosity within a finite volume is partitioned into m porosities, each representing a continuum of either a matrix pore type or a fracture type. It is a system of collocated interacting continua each representing a partition of the pore space within the finite volume. At each finite-volume location, any one or all of the pore types can be absent.

The multi-modal multi-fracture reservoir is represented as containing in its cells collocated multiple continua which are multiple interacting. At each physical grid cell location, each of the multiple collocated grid cells of same geometry and block volume represents each of the modes of pore space and each of the scale of fractures. Thus, this can be referred to as a multiple porosity representation.

In this way, each of collocated cells can be prescribed its own porosity, permeability tensor, wettability, and other rock type properties. These collocated cells are multi-interacting. Each collocated cell is connected to the others at the same reservoir location, and multiphase co-current or counter-current fluid exchanges take place depending on the phase flow potential differences between each pair of the collocated cells. Within a continuum, each cell can have fluid flow with its neighboring cells in the usual way as in a single porosity simulation. The transmissibility calculation for the intra-porosity flow term between neighboring grid cells within a single continuum is based on the finite-volume computational stencil with harmonic averaging of the respective cell permeabilities. For the inter-porosity transmissibility calculation, the matrix-fracture transmissibility calculation is specified as a fracture network spacing characterization, and the matrix permeability tensor and the matrix-matrix transmissibility calculation are specified as the interporosity shape factor and the micro pore permeability.

Figure 7A:
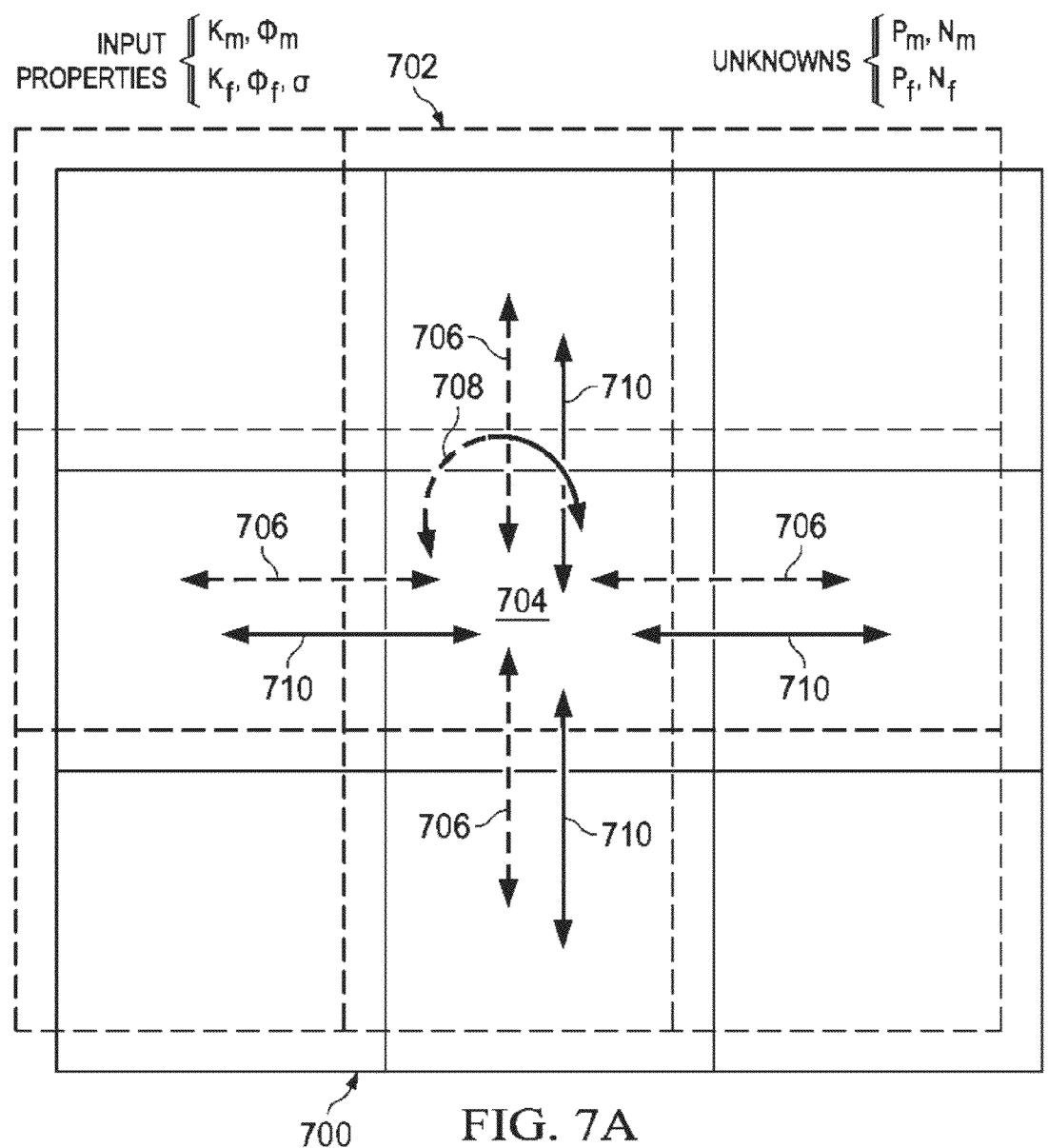
FIG. 7A is a schematic diagram illustrating two collocated continua in a two dimensional or 2D grid.

FIG. 7A illustrates a schematic diagram for the DPDP model which is the highly simplified case when the number m of porosities equals 2. In this case, one continuum is representing the matrix and the other continuum is representing the fracture. Two collocated finite volume grids 700 and 702 are used in FIG. 7A to represent the two continua in a five-point finite volume discretization and the collocated cells interact through the matrix-fracture exchange flow terms. For the intercontinuum exchange for a center cell 704, fracture-fracture flow exchanges are schematically indicated by arrows 706, matrix-fracture exchanges by arrows 708 and matrix-matrix exchanges by arrows 710.

Figure 7B:
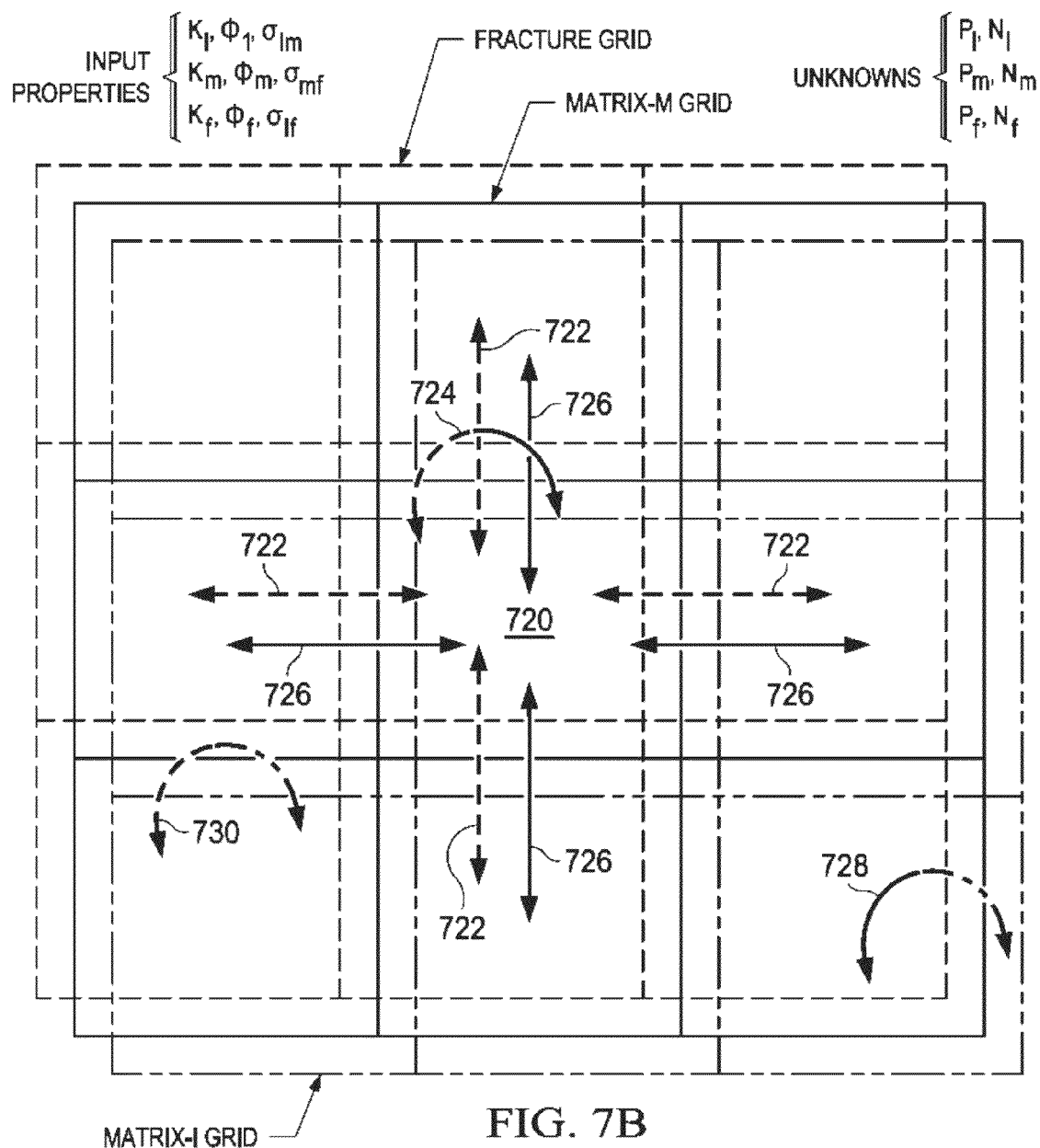
FIG. 7B is a schematic diagram illustrating three collocated continua in a 2D grid.

If the matrix porosity is observed to be dual mode as shown in FIG. 3 and the micropore matrix I permeability is orders of magnitude less than that of macropore matrix M, then three collocated continua are present. Thus, three collocated finite volume grids in a five-point finite volume discretization are used. This is shown in FIG. 7B. In this case, three types of inter-porosity exchange terms are used: fracture-fracture exchanges; matrix-matrix exchanges and matrix-fracture exchanges.

In FIG. 7B, fracture-fracture exchanges are indicated for a center cell 720 by arrows 722. Similarly, exchanges between a macropore matrix M and fractures are indicated by arrow 724, exchanges between macropore matrices I by arrow 726, exchanges between micropore matrices M and macropore matrices M by arrow 728, and exchanges between micropore matrices I and fractures by arrow 730.

It is to be noted that the multi-continuum methodology herein described can also represent a classical SPSP model as a simplified case. A single continuum can be used to represent the multiphase fluid flow and transport phenomena in the reservoir deemed sufficient so that the multi-continuum generalization is considered unnecessary.

In the MIC system, a complete set of balance equations for components (NC+1) for each grid cell x of each porosity partition k is needed with the attendant inter-continuum exchange terms. The multiphase multicomponent discrete material balance equations can be written:

$$\frac{V_b \phi_k}{\Delta t} \Delta [\rho_o x_i S_o + \rho_g y_i S_g]_{k,x} = \sum_j \left[ T \rho_o x_i \frac{k_{ro}}{\mu_o} (\Delta \Phi_o) \right]_{k,x} + \quad (1A)$$

$$\sum_j \left[ T \rho_g y_i \frac{k_{rg}}{\mu_g} (\Delta \Phi_g) \right]_{k,x} + \sum_{l \ne k} \tau_{lki,x} - q_{ki,x}$$

$$\frac{V_b \phi_k}{\Delta t} \Delta [\rho_w S_w]_{k,x} = \sum_j \left[ T \rho_w \frac{k_{rw}}{\mu_w} (\Delta \Phi_w) \right]_{k,x} + \sum_{l \ne k} \tau_{lki,x} - q_{kw,x} \quad (1B)$$

i=1, 2, ..., $N_c$
j∈ all gridblock neighbors
k=1, 2, ..., m
l∈ no. of MIC, l≠k

Equations 1A and 1B take the typical approximation in petroleum reservoir simulation that the hydrocarbon components do not partition into the aqueous phase and the aqueous phase does not partition into the hydrocarbon phases. However, the multiple continuum methodology according to the present invention is general. It should be understood that the methodology is applicable to any general or particular fluid phase partitioning one chooses to use. The generalization for hydrocarbon components to partition into the aqueous phase is also contemplated with the present invention.

In the equations, $V_b$ is the cell volume, $\phi_k$ is the porosity of the pore system partition k, $\rho$ is the fluid phase density, S is the fluid phase saturation, T is the inter-cell transmissibility, $k_r$ is the phase relative permeability, $\mu$ is the fluid phase viscosity, $x_i$ is the mole fraction of component i in the oleic phase, $y_i$ is the mole fraction of component i in the gaseous phase, $\Phi$ is the flow potential, $N_c$ is the number of hydrocarbon components and m is the number of porosities, which includes all of the fracture porosities and matrix porosities, and subscripts o, g, w refers to the oleic, gaseous, and aqueous phases.

A porosity partition can be a matrix porosity partition or a fracture porosity partition. A porosity partition may or may not contribute to global flow and thus only act as source or sink to other connected porosity partitions. In a porosity partition, for example, the microporosity which does not contribute to global flow is a discontinuous medium. This continuity determination can be done locally via a transmissibility threshold at each connection of each grid block representing a porosity partition at a grid location. If all of the inter-porosity transmissibilities are less than the minimum threshold, the mass balance equation of Eqns. 1A and 1B simplifies to:

$$\frac{V_b \phi_k}{\Delta t} \Delta [\rho_o x_i S_o + \rho_g y_i S_g]_{k,x} = \sum_{l \ne k} \tau_{lki,x} - q_{ki,x} \quad (2A)$$

$$\frac{V_b \phi_k}{\Delta t} \Delta [\rho_w S_w]_{k,x} = \sum_{l \ne k} \tau_{lkw,x} - q_{kw,x} \quad (2B)$$

The interporosity transfer terms tau, $\tau_{lki}$, for hydrocarbon component i between continuum k and l, has the form:

$$\tau_{lki} = \sigma'_{lk} \{ \lambda_{oi}^\alpha (\Phi_{ol} - \Phi_{ok}) + \lambda_{gi}^\alpha (\Phi_{gl} - \Phi_{gk}) \} \quad (3)$$

In Equation 3, the term $\Phi$ is the potential of the subscripted phase and medium. The mobility terms $\lambda_{oi}^\alpha$ and $\lambda_{gi}^\alpha$ for component i are for the oil and gas phase with upstream direction α and are defined as:

$$\lambda_{oi}^\alpha = \left( \rho_o x_i \frac{k_{ro}}{\mu_o} \right)^\alpha ; \lambda_{gi}^\alpha = \left( \rho_g y_i \frac{k_{rg}}{\mu_g} \right)^\alpha \quad (4)$$

There are three types of interporosity transfer terms, namely, the matrix-fracture transfer terms, the matrix-matrix transfer terms, and the fracture-fracture transfer terms. For clarity, we use superscripts mf, mm, and ff to be used to distinguish among these terms.

For the matrix-fracture transfer terms, the shape factor $\sigma_{lk}^{mf}$ in Equation 3 for inter-porosity flow where l is a matrix type and k is a fracture type can be defined as:

$$\sigma_{lk}^{mf} = \sigma_{lk}^{mf} \left[ \frac{\phi_k}{\sum_{m \ne f} \phi} \right] \quad (5A)$$

$$\sigma_{lk}^{mf} = C V_b \left( 1 - \sum \phi_f \right) \left( \frac{k_{lx}}{L_{kx}^2} + \frac{k_{ly}}{L_{ky}^2} + \frac{k_{lz}}{L_{kz}^2} \right) \quad (5B)$$

The term $\sigma_{lk}$ can vary from grid cell to grid cell. If continuum l represents a fracture type, then, $\sigma_{lk}$ is typically characterized by using fracture characterization software, taking into account of fracture intensity, connectivity, and distribution, geometry, and flow characteristics.

The matrix block dimensions $L_{kx}$, $L_{ky}$, $L_{kz}$ are idealized representation of a fractured reservoir with three orthogonal sets of fractures in the Cartesian coordinate directions. When this idealization does not apply, a flow-based upscaling procedure can be used to calculate each matrix-fracture transfer shape factor associated with each fracture type independently. The matrix permeabilities for matrix porosity k in the x, y, and z directions are $k_{lx}$, $k_{ly}$, $k_{lz}$, respectively. The factor C is the shape factor parameter and $V_b$ is the grid cell volume.

For the fracture-fracture transfer term, the shape factor has the form:

$$\sigma_{lk}^{ff} = C V_b \left( 1 - \sum \phi_f \right) \left( \frac{k_{lx}^e}{L_{kx}^2} + \frac{k_{ly}^e}{L_{ky}^2} + \frac{k_{lz}^e}{L_{kz}^2} \right) \quad (6)$$

where in the equation k is the large-scale fracture system and l is the small-scale fracture system. The effective fracture permeability for the fracture system l in terms of the homogenized fracture permeability is:

$$k_{lx}^e = \phi_l k_{flx} \quad (7)$$

For the matrix-matrix transfer term, the continua l and k both represent matrix types and $\sigma_{lk}^{mm}$ is the length scale δ for inter-porosity flow and the permeability $k_{lk}$ is chosen to be the micro-pore permeability when there is at least one order of magnitude differences in the permeability of the continua l and k. Otherwise, a harmonic average of the permeabilities of the two continua is used.

$$\sigma_{lk}^{mm} = \delta_{lk} k_{lk} \quad (8)$$

It should be noted that $\sigma_{lk}^{mm}$ represents the matrix-matrix transfer at the grid-cell level. Additional constraint equations from each of the matrix and fracture porosity systems per grid block include phase saturation balances, phase equilibrium equations and capillary function and relative permeability relationships. These equations are widely available in the literature and are summarized below.

The phase saturation balances are as follows:

$$S_o + S_w + S_g = 1 \quad (9)$$

The phase equilibrium condition is written in terms of the equality of fugacity between the phases:

$$F = \ln(\phi_i^G y_i) - \ln(\phi_i^L x_i) = 0 \quad (10)$$

The equality constraints for phase and overall compositions are:

$$\sum_{i=1}^{N_c} x_i = 1 \quad (11A)$$

$$\sum_{i=1}^{N_c} y_i = 1 \quad (11B)$$

$$\sum_{i=1}^{N_c} z_i = 1 \quad (11C)$$

The oil-water and gas-oil capillary pressure relationships are:

$$P_{cow} = f(S_w) \quad (12A)$$

$$P_{cog} = f(S_g) \quad (12B)$$

The typical two-phase and three-phase relative permeabilities can be expressed as:

$$k_{rw} = f(S_w) \quad (13A)$$

$$k_{rg} = f(S_g) \quad (13B)$$

$$k_{ro} = f(S_w, S_g) \quad (13C)$$

As shown in Equations 1 and 2, the wells can be completed in general grid cells and have fluid exchange with some or all of the multiple continua at each perforated location. Therefore, the well constraint equation for the flow rate of component i is the double summations over all the perforations p of all the porosities l and may be written as:

$$q_{wi} = \sum_{p=1}^{nperf} \sum_{l=1}^{m} q_{ipl} \quad (14)$$

The MIC system thus has multiple equations per grid cell of each porosity partition where the equations representing the discrete form of conservation laws are applied to each species or quantity being modeled. The number of grid cells used in a simulation model depends on the resolution required to properly represent the flow physics and heterogeneities of the rock matrix and fracture system.

For a full-field simulation, depending on the size and complexity of the field, this can be a few million grid cells to hundreds of millions of grid cells. The size of a MPMP model where there are m partitions of porous continua can be m times bigger than the homogenized SPSP model. However, the typical MPMP model has far fewer cells than that, as not all porosity partitions are present at all physical locations. However, due to the property contrasts, some cells in the MPMP model may have very small pore volumes and very high inter-cell transmissibility. The transient time stepping through complex nonlinearities and discontinuities such as phase and component appearance and disappearance make these models numerically much more challenging to simulate compared to the SPSP model.

Multi-Continuum Multi-Subdomain Distributed Data System

The data system of the present invention and its handling of the spatial variability of MIC and its organization of the data for parallel JO and parallel simulation so that the processing methods and the overall system are scalable to massively parallel application is a feature and advantage of the present invention. The data system is distributed because the system uses N parallel processes wherein each process holds only a partition of the global data space. It is multi-subdomain because the flow system is global and tightly coupled; the data system must represent the interrelationship of the N subdomains and the underlying connectivities between grid cells across subdomains. It is multi-continuum to represent the flow physics of multiple interacting continua. The reservoir grid system can be structured, unstructured, or hybrid.

The reservoir may be gridded in three dimensional or 3-D into contiguous grid cells or finite volumes. The grid can be a structured grid or an unstructured grid. In both cases, the geologic layering of the reservoir is honored. An unstructured grid which is unstructured laterally but honors the geological layering of the reservoir is called a 2.5 dimensional or 2.5-D unstructured grid system. If unstructured grid is desired for geometric flexibility for describing complex well or faults, then a 2.5-D unstructured grid is preferred over the 3-D unstructured grid. Otherwise, structured grids such as Cartesian grids with variable depths and thicknesses or the corner-point-geometry grids are the typical choice of gridding systems.

Figure 8:
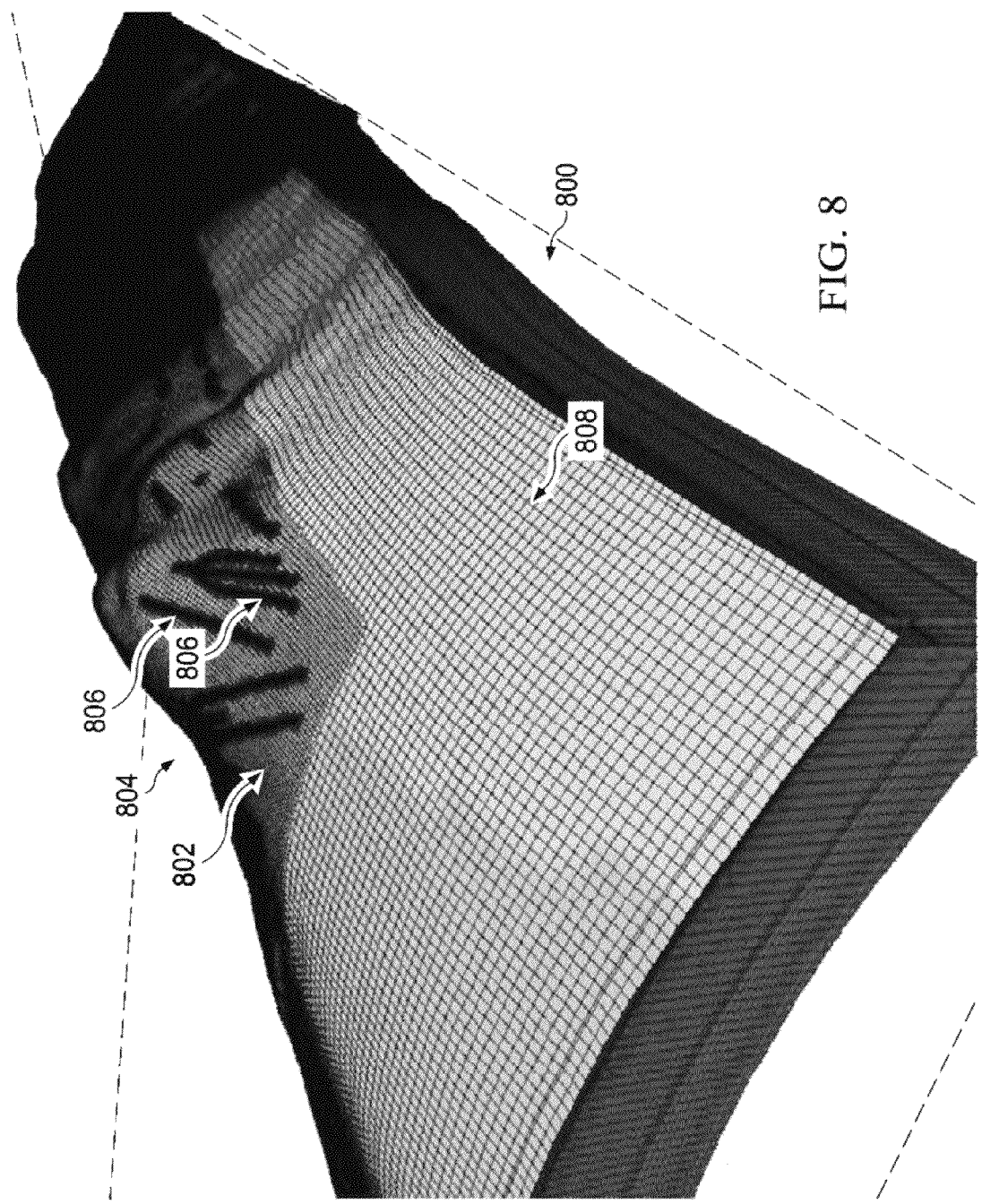
FIG. 8 is a display of a multi-layered reservoir of the type in which multiphase flow is simulated according to the present invention.

An example of a reservoir grid system is shown in FIG. 8 which illustrates a multi-layered unstructured grid 800 for a giant subterranean reservoir. The reservoir grid system 800 of FIG. 8 uses complex near cell grids as shown at 802 in an area of interest 804 with well grids 806 present. The grid system 800 also has a far-field coarse grid as indicated at 808. It can be seen that grid size variations are based on regions of particular interest in the reservoir. What are known as quad-tee based grid transitions are present between regions. An example technique of forming such a grid system is set forth in co-pending U.S. patent application Ser. No. 12/876,727 filed Sep. 7, 2010, now U.S. Pat. No. 8,386,227, of which Applicant is a named inventor.

For processing according to the present invention, each grid cell in the reservoir is assigned a global index. This global index is the same index for each continuum. The simulation property model contains grid cell data such as porosity, permeability, water saturation, rock types, shape factors, or matrix block sizes. The simulation property model can be directly the geocellular model or an upscaled property model with less grid cells.

The property data stored on disk is organized based on the global cell index. Each property for each continuum is a contiguous data array. The simulation property model is one or more of disk files containing these property data arrays stored on the simulation file system. Since the number of parallel processes for each simulation run can vary, the property model is organized independently of the runtime parallel environment. Similarly, snap shots of simulation results are written to disk as contiguous data arrays in global cell ordering. The visualization process, which may be serial or parallel, is independent of the parallel processing requirement of the simulation methods and system. The output global cell indexing may or may not be the same such that it is flexible for upstream and downstream system integration.

Three grid cell indexing systems and the associated ordering and reordering methods are provided in the present invention. First, the global cell index is the global cell number assigned to each grid cell of a continuum. The multiple continua are first ordered consecutively with each matrix mode, followed by each fracture mode. This ordering of the continua is not significant as long as this is consistent for all the input property data and a name is prescribed to each continua such that the references to a continuum is by an assigned name instead of a number. The global cell number in a continuum is in fact the index of any grid property array stored on a file system of the simulation system data server 56.

Second, during the input processing stage of a simulation run, the global domain is partitioned into N subdomains for the simulation run using N parallel processes in a corresponding number of processors 50. Each subdomain thus is assigned or in effect owns a particular part of the global grid during this partitioning. The N subdomains are referred to as input subdomains and the local cell indices of the input subdomains are the second indexing system. The local to global reference uniquely defines the input subdomain cell ownership and the parallel input mechanism to read grid property data from a globally ordered data array stored on a simulation data file server 56. If there are a total of M interacting continua, there can be from 0 to M number of collocated cells at each physical grid location. The active cell status for each cells of each continuum is determined during simulation runtime.

Since only active cells are carried during transient flow simulation time stepping, for efficient load-balanced parallel computation and data store, simulation domain partitioning can only be calculated after cell status has been determined. These are defined as the simulation subdomains. Therefore, the third cell indexing is the local index of every cell in a simulation subdomain. The local to global reference uniquely defines the global cell index for each local cell in each simulation subdomain.

To manage inter-domain flow calculation, a boundary strip of cells known as the halo cells is needed. Halo cells are cells which belong to neighboring simulation subdomains and the data storage locations allocated for halo cells are used to hold information during peer-to-peer communication among the N processes during parallel reservoir simulation.

Figure 5:
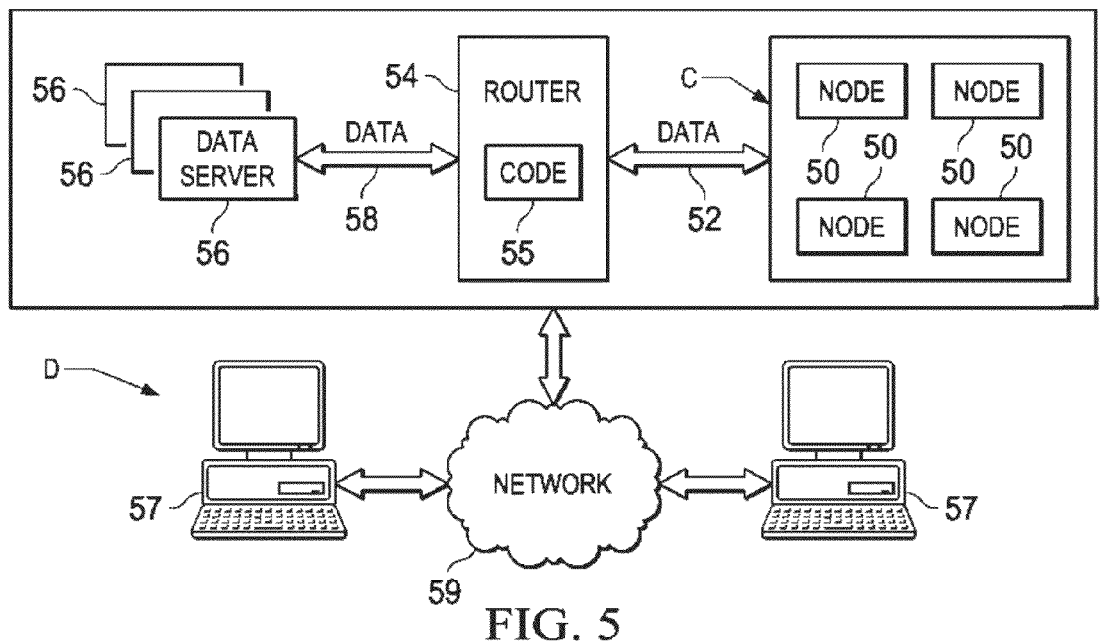
FIG. 5 is a schematic diagram of a computer network for simulating multiphase flow and transport in a fractured subterranean reservoir according to the present invention.
Figure 9:
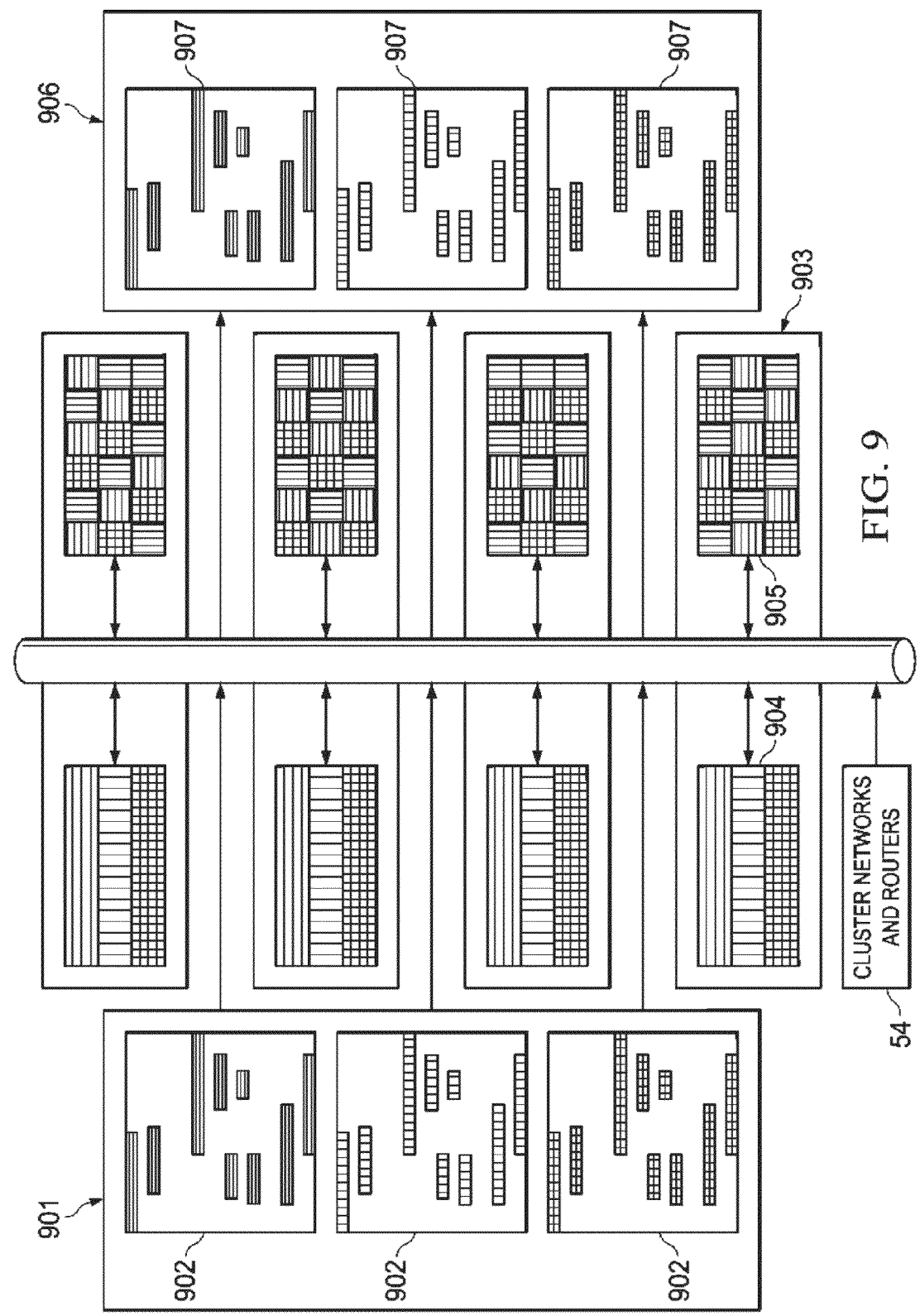
FIG. 9 is a schematic diagram of data flow and organization illustrating organization of local data in input domain partitions and simulation domain partitions residing in memory of separate parallel processors for a simulation run according to the present invention.

The data flow and organizational schematic for indexing according to the present invention is shown in FIG. 9. Disk files 902 shown in FIG. 9 contain the simulation property model of each continuum and residing on simulation file system 901 stored in the data servers 56 shown in FIG. 5. Each property data in files 902 is in contiguous store in global cell indexing. The local data shown in FIG. 9 are organized in input domain partitions 904 and simulation domain partitions 905 residing in memory of separate parallel processes 903 performed by processors 60 of nodes 50 for a simulation run. Local ordering in input domains and simulation domains varies depending on the number N of processes used, grid cell interconnectivity, and the MIC grid cell activity status maps which are determined prior to the simulation run. Data maps for each continuum are indexed binary files 902 in global cell ordering, which is invariant with the number of processes for simulation runs. A parallel simulation job using N processes, each in one of the processors 60 of computer nodes 50 of FIGS. 5 and 6, is assigned and owns for the purpose of processing a partition of grid cells representing a noncontiguous collection of cells from the global grid.

At run time of a parallel simulation using N processes, the simulation data system consists of the input data subdomains and simulation data subdomains. Input data subdomains are N-process local data partitions which partition the entirety of cells in the reservoir. Simulation data subdomains are N-process local data partitions which partition active cells only. These are the active subdomains pre- and post-determination of the cell activity status of each continuum of the MIC. Each of the two domain partitions is load balanced for scalable parallel performance at their respective stages of simulation.

The parallel processes 903 of the N processes invokes process step 403 (FIG. 4) to read its own input domain partition and store these in RAM of the involved processor 60 in the input subdomain local cell ordering as illustrated in 904. A distributed N-process local to global reference is used to perform this parallel read from each process. The input subdomain local cell ordering organizes each continuum of the MIC sequentially.

The input local to global reference system, computed in step 402, is based on a 2D partition of a single horizon of a single continuum and includes all grid cells. The reference system is the same for each continuum of the MIC and the parallel input for each property array can be handled in the same way with an offset. The local cell activity status is determined at runtime in step 404 and depends on the user-specified dead-cell porosity and deal-cell pore volume. These can also be variable for each continuum of the MIC. When a cell has pore volume or porosity below the prescribed thresholds, it is considered a dead cell. The remainders are the active cells. Thus, the porosity count at each physical grid location can vary from zero to m porosities. In the MPMP simulation system, a grid cell is assigned to each of the active porosity at each of the grid location.

The simulation domain partitions are computed in step 405 after cell activity status is determined in step 404. The simulation domain partitions include active cells only, and in general differ from input domain partitions which include all cells. Step 405 uses a successive bisection method such that each subdomain contains optimally nearly an equal number of active cells, and the cell faces exposed on the subdomain boundaries are minimized. The number of active porosities at each MIC node of the single-continuum 3D graph is used as node weights. This partition strategy ensures scalable, load-balanced parallel simulation and minimizes the inter-process communication for the tightly coupled global flow model.

The simulation subdomain local cell ordering in domain partitions 905 orders the collocated cells in M inter-porosity first, followed by the intra-porosity ordering through Z-lines, followed by lateral intra-porosity line ordering. This line ordering can optionally be based on tracing the 2D graph of the maximum column sum of inter-Z-line lateral transmissibilities. This simulation subdomain local reordering of cells is computed in step 406 and results in the simulation subdomain local to global reference system. This local reordering is strategic for the MIC parallel processing, as will be described.

The distributed unstructured dual-level graphs for MIC is computed in step 407 using partitioning and ordering information from steps 405 and 406. The connectivity graph is parallel distributed and has two levels. The first level describes the domain level connectivities. The second level describes the cell level connectivities. Each process holds its own piece of connectivity graph, and each contains the necessary information to perform flux computation among grid cells its own and to perform inter-processor communication in order to compute fluxes between its own grid cells on the domain boundary and with other grid cells belonging to neighboring subdomains.

Disk files 907 in storage servers 56 (FIG. 5) contain the output files of snapshots of chosen grid variables for each continuum of the MIC and residing on simulation output file system 906. File system 901 and 906 can also be the same file system. Each property data in disk files 907 is in contiguous store in global cell indexing which is the same for all MIC. Step 419 is the parallel method to write output files 907. The N-process simulation subdomain local to global indexing is used to specific array element lengths and offsets required for the parallel file output.

An example of the simulation subdomain data partition of a reservoir is shown in FIGS. 10A, 10B and 10C. The reservoir, a portion of which is indicated schematically at 100 (FIG. 10A) is gridded with a multilayered structured mesh 102 as detailed in FIG. 10B. FIG. 10A shows that subdomain partitions are uneven and unstructured but the number of active cells in each subdomain is optimally nearly equal. For load-balanced computation, they are necessarily uneven and unstructured because of the variability of MIC at each mesh location, as illustrated in FIG. 10C. The continua of the mesh locations of FIG. 10C are identified in a like manner to the techniques of FIGS. 7A and 7B as described above.

FIGS. 11A and 11B are an example illustrating the data system for handling of inter-domain connectivities during steps 406 and 407 of the processing sequence described above. Subdomain partitions for a group of cells in FIG. 11A show a subdomain 1100 (FIG. 11B) containing its own MIC cells with interior cells 1102 and boundary cells 1104 as well as ghost or halo cells 1106 which belong to neighboring subdomains. This connectivity is detailed as a distributed dual-level graph: the top level is the inter-domain graph and the second level is the inter-cell graph for boundary cell connectivity across subdomains.

As has been described, step 407 computes the distributed dual-level graph based on the simulation subdomain cell ordering. For local simulation subdomain cell ordering, besides the cell adjacency and connection strength considerations discussed above, there are also MPI communication hiding and cache efficiency considerations. Thus, step 406 indexes cells 1102 in the interior of the subdomain first. These are cells which do not have an external connection. This is followed by the indexing of subdomain boundary cells 1104. Since data store is also reserved for the ghost or halo cells 1106 in order to compute flux and flux-related quantities at subdomain boundary, ghost cells 1106 are also indexed after the subdomain boundary cells 1104. Boundary cells 1104 which belong to the same inter-domain connections are indexed contiguously. This is done similarly for the ghost cells 1106.

The Multiple-Interacting Continua Parallel Solution Method

The parallel step 413 in FIG. 4 is the system processing. In the general MIC simulation, each physical finite-volume location can have from 0 to m number of collocated interconnected active cells. Each of these cells represents a distinct porosity partition. Furthermore, neighboring cells within the continuum are connected with each other through their cell faces.

The parallel processing of the present invention is sensitive to the relative strengths of the flow terms within each continuum and the inter-porosity flow between the continua. The application of the generalized Newton's method to the system of nonlinear discrete partial differential equations involving the mass, momentum, and energy conservation of multiphase multicomponent flow as described in Equation 1 through 14 above results in a system of algebraic equations in the form:

$$[A]\{x\}=\{R\} \qquad (15)$$

Where [A] is the system Jacobian matrix, $\{x\}$ is the vector of system unknowns, and $\{R\}$ is the vector of system residuals. Matrix [A] is unstructured but the system ordering arranges the positions of nonzero for the MIC system such that the described solver method can be exploited advantageously to solve the system in a scalable way and is extensible to massively parallel application.

On each block matrix row, the inter-continuum connections are ordered nearest to the diagonal and followed by the vertical intra-porosity connections. The lateral connections are ordered furthest away from the diagonal. The intent of this ordering is to partition the system matrix into the [P] matrix and the [E] matrix:

$$[A]=[P]+[E] \qquad (16)$$

Figure 12A:
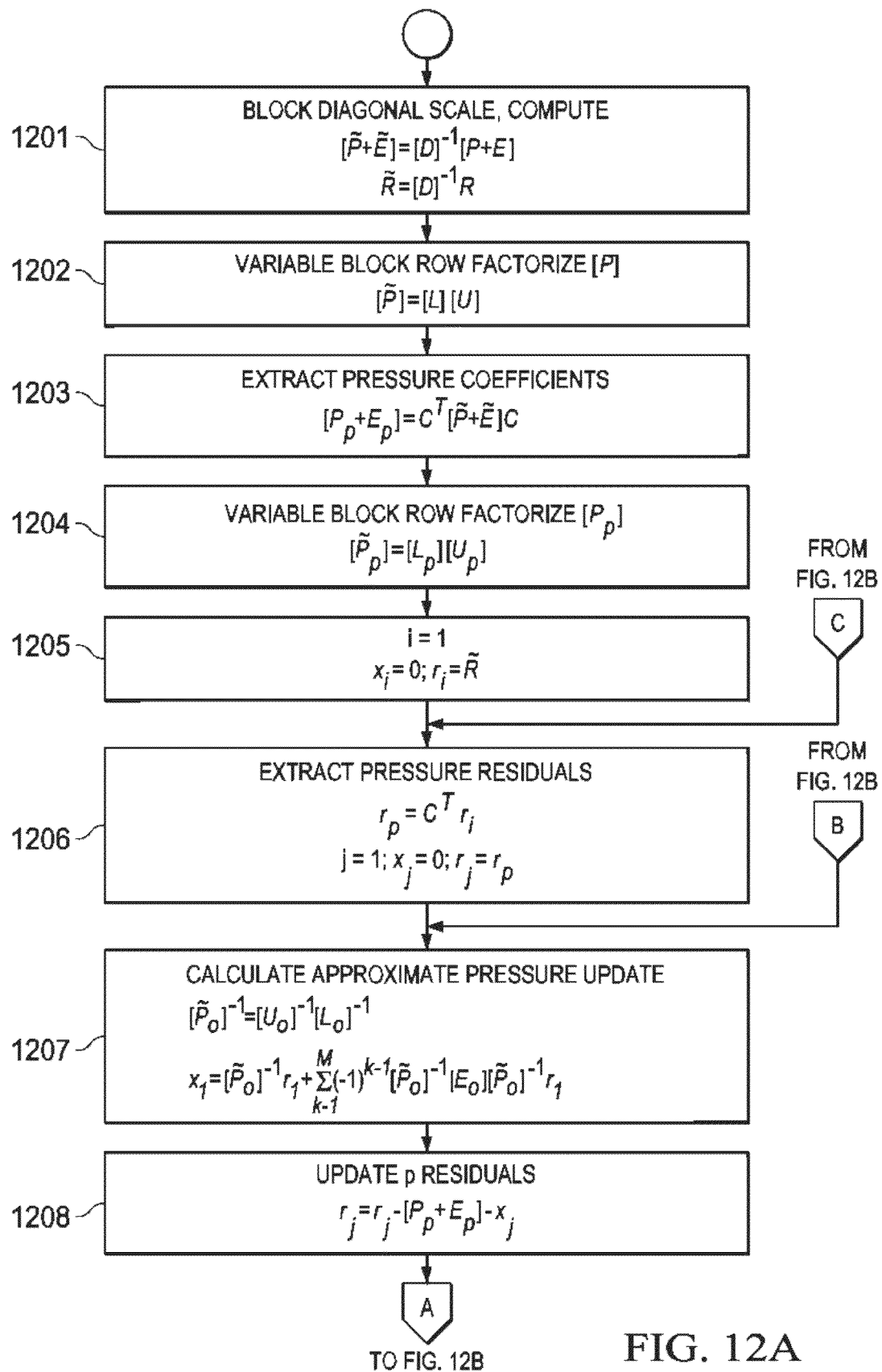
FIGS. 12A and 12B are functional block diagrams of a flow chart of data processing steps for a portion of the data processing sequence of FIG. 4.
Figure 12B:
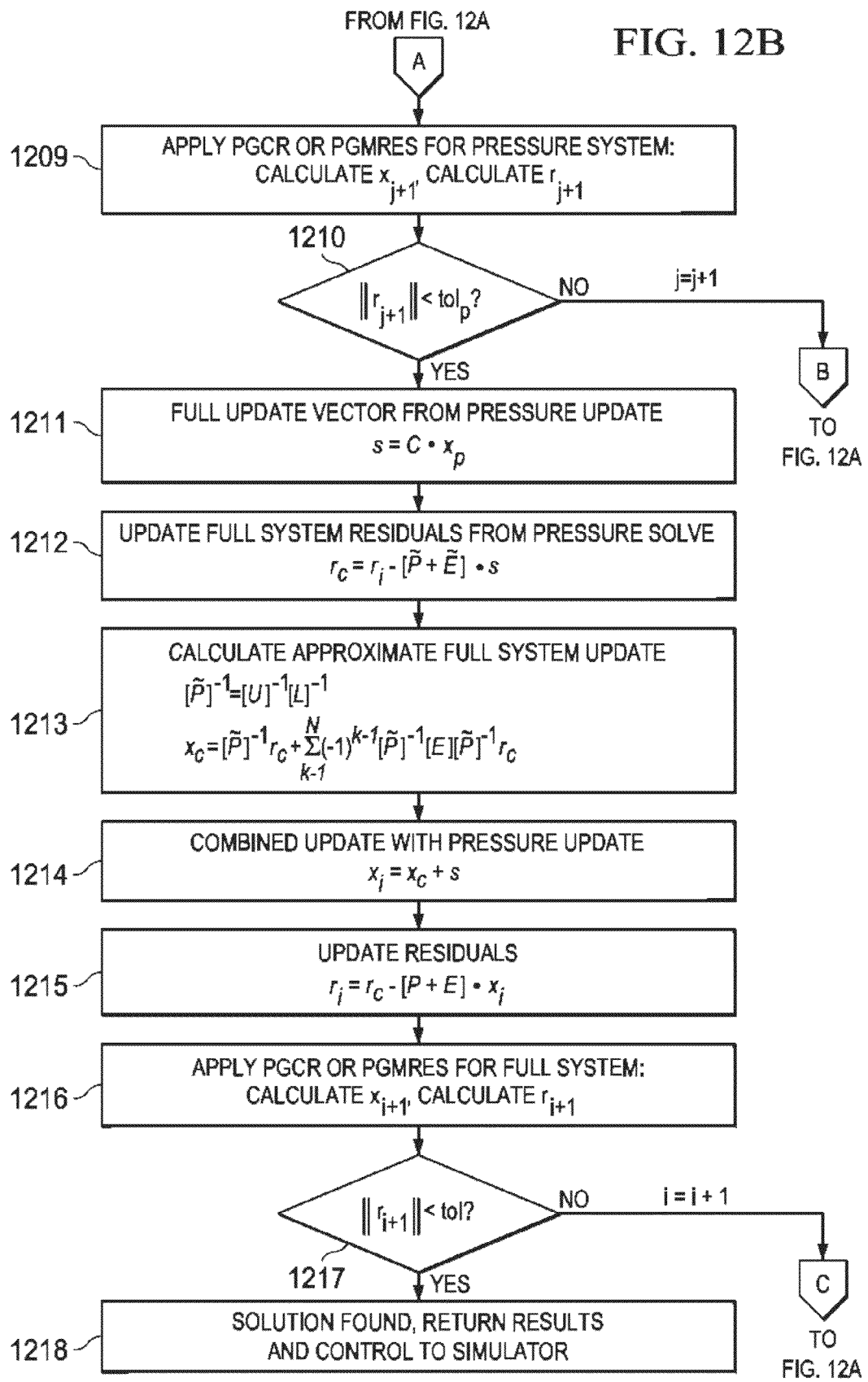

The system solution flow diagram for processing done during step 413 of FIG. 4 is shown in more detail in FIGS. 12A and 12B. The methods performed are parallel methods which use the data ordering and processing system described above. The [P] matrix and [E] matrix are distributed matrices where each of the N processes owns the block coefficients belonging to the grid cells within its subdomain. Using the local cell ordering described above, the [P] matrix contains the appropriate diagonal block sub-matrices, the inter-continuum block sub-matrices and vertical intra-continuum block sub-matrices. The [E] matrix contains the requisite lateral intra-continuum block sub-matrices which includes both the intra-subdomain and inter-subdomain connections. These block coefficients are organized to maximize cache reuse and to facilitate MPI communication hiding during matrix-vector multiply operations.

Step 1201 scales the block rows of the system matrix by the block diagonal inverse. Since data store for the entire block rows of each subdomain is local, this step is fully parallel and requires no synchronization. Step 1202 computes the [L][U] matrix for [P] using the variable block row complete LU factorization method. Because the number of continua at each location is a variable, the number of nonzero sub-block-matrices at each block row of [P] is variable, depending on the number of active continuum present at a physical position. Hence it is a variable block row factorization where the number and pattern of the fill factors can be predetermined for a given parallel partition and local cell ordering for each process. They are determined in a preprocessing step.

An example illustrating the pattern of [P] for a column of four grid locations with multi-continua is shown in FIGS. 13A, 13B and 13C. In FIG. 13A, the uppermost location 1301 has three pore partitions (1, M, F), location 1302 has two pore partitions (1, M), location 1303 has three porosity partitions (1, M, F) and location 1304 has two partitions (M, F). The schematic interporosity connectivity and vertical intra-continuum connectivity for the four grid locations of FIG. 13A is illustrated in FIG. 13B, and the [P] matrix of non-zero sub-matrices of the four grid locations is shown in FIG. 13C.

In the processing of grid cells, step 1203 extracts the pressure coefficients matrix from the full-system coefficient matrix. [C] and [C]T are the restriction and prolongation operators in the algebraic extraction process. Step 1204 computes the $[L_p]$ and $[U_p]$ matrix for the pressure $[P_p]$ matrix. This is the variable block row method factorization method for the pressure system. Step 1205 simply initializes the full-system iteration process. Step 1206 extracts the pressure residual from the full system residuals. Step 1207 performs an approximate pressure solution by doing a series of forward and backward solution and matrix-vector multiplications as shown in the matrix equation. This step includes the MPI communication method at each matrix-vector multiplication. This method includes communication hiding strategy to enhance parallel scalability. Step 1208 update the pressure residuals from the current iterate of the pressure updates.

Step 1209 uses the parallel version of either the conventional GCR(k) or GMRES(k) methodology to obtain an optimized update which minimizes the residuals. An explanation of the serial GMRES(k) methodology can be found in Yousef Saad, "Iterative Method for Sparse Linear Systems", SIAM, 2003. An explanation of GCR(k) can be found in P. K. W. Vinsome, "Orthomin, an Iterative Method for Solving Sparse Sets of Simultaneous Linear Equations", SPE 5729, pp. 149-153, 1976.

Step 1210 is the convergence check for the approximate pressure solution. The j-indexed iterative loop from 1206 to 1210 is the pressure iterative solution loop. The pressure solution is used to constraint the full system residual to accelerate the full-system solution. Step 1211 expands the pressure solution vector to a full-system solution vector. This is used to reduce the full-system residual in step 1212. The reduced full-system residual is then used to compute an approximate full-system update using the matrix equation indicated.

The combined update from both the pressure system and full system is computed in step 1214. The full system residual update is computed in step 1215 with a matrix-vector multiple step. Step 1216 is the full-system version of the parallel GCR(k) or GMRES(k) methodology which optimizes on the full-system update such that the residuals are minimized. Step 1217 is the full-system convergence check. The i-indexed iterative loop from steps 1206 to 1217 is the full-system iterative solution loop.

The parallel solver method to solve the resulting System Equations calculates an approximate pressure solution and then an approximate full-system solution as a preconditioner for the parallel PGMRES or the parallel PGCR iterative methods. The approximate solutions are computed via approximate inverse of the system matrices. This is calculated by first sub-structuring the Jacobian matrix into a P and an E matrix, and then followed by the LU factorization of the P matrix. The E matrix is handled as a matrix n-term series expansion with embedded LU forward and backward substitution wherever a solution for the P system arises. The primary parallel overhead is in the peer-to-peer communication during matrix-vector multiplication operations and the parallel vector dot product computation used in PGMRES and PGCR iterations. The communication overhead is minimized via a communication hiding mechanism.

Figure 14:
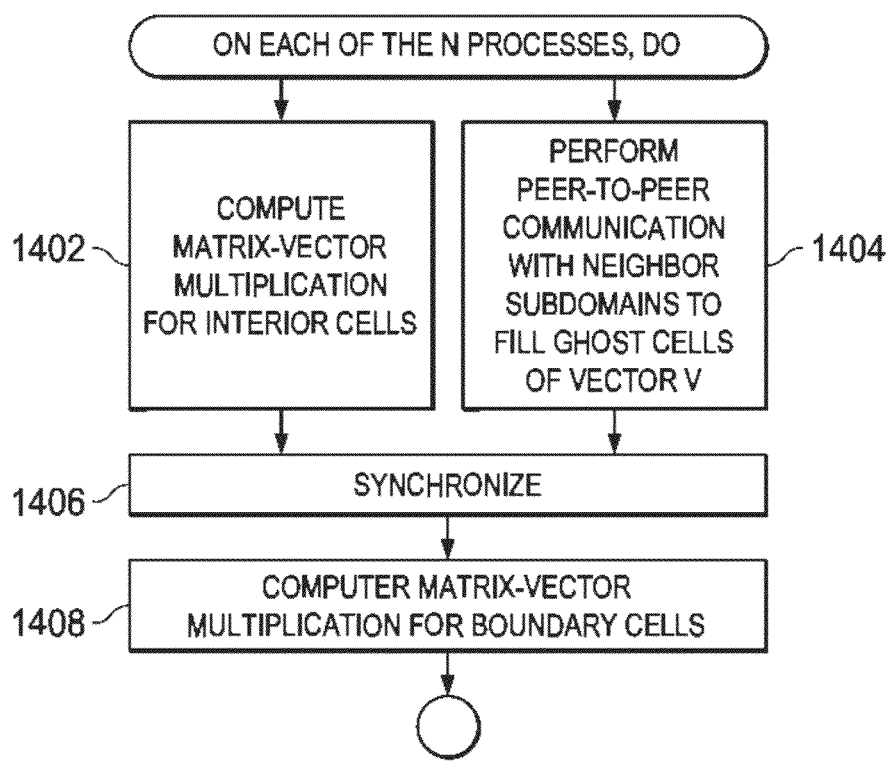
FIG. 14 is a functional block diagram or flow chart of data processing steps for parallel matrix-vector multiplication with communication hiding performed during the processing sequence of FIGS. 12A and 12B.

Steps 1207, 1208, 1213, and 1215 embed matrix-vector multiplication which involves MPI communication with a communication hiding algorithm. This is outlined in FIG. 14. Matrix-vector multiplication during step 1402 for interior cells is done simultaneously and synchronized as indicated at 1406 with the MPI communication during step 1404 to fill ghost cells of vector V. Matrix-matrix multiplication is then performed for boundary cells as indicated at step 1408. When communication is complete, local vector V now contains the required ghost cell information and the matrix-vector multiplication can be done for the remaining boundary cells. Step 1209 and 1216 involve distributed a vector dot product which requires MPI reduction operations. The other steps are fully parallel steps which require neither communication method nor synchronization points.

From the foregoing it can be seen that the data system according to the present invention is unstructured and fully distributed parallel. It is crafted to be efficient for both structured and unstructured grid systems where the underlying solution domain is characterized as multiple interacting continua. Each continuum can have a variable and significant fraction of null grid cells. The multi-continuum multi-domain connectivity is represented as a distributed dual-level graph which includes the description of intra-domain and inter-domain connectivities at the subdomain level and at the grid cell level.

The present invention localizes data storage and processing such that a global hash table is not needed. This optimizes memory use and data access on variables which belongs to the local subdomain of finite volumes only. The solver method is tailored to be insensitive to the domain partitioning and to yield nearly the same iteration counts and work counts independent of the number of parallel processes used to simulate a given model. These attributes of the present invention are keys to scalability and performance from small-scale parallelism to the massively parallel application. It is thus very efficient on today's multi-core multi-process multi-node HPC system.

The present invention is completely flexible in terms of the existence of any number of pore modes and fracture networks at each physical cell location within a simulation model. Thus, a simulation model can contain multiple reservoirs, each may or may not be fractured, and each may have unimodal or multimodal pore spaces. The granularity of multi-modality is at each physical grid cell location. The domain partitioning is based on active cell status of each grid cell of each of the multiple continua.

The present invention thus permits parallel simulation of multiphase flow in a fractured subterranean reservoir where the pore space can be multimodal and the fracture can be multi-level of fracture networks of different scales. The reservoir in question typically has a sedimentary origin and the rock properties typically have high frequency variation through the geologic layers and low frequency variation laterally within a layer. The nature of the variation has to do to with the depositional environment.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of simulation of multiphase flow of fluids within cells of a subterranean reservoir organized into a grid of reservoir cells based on input reservoir data, the reservoir cells having multiple interacting continua in which the multiphase fluid flow takes place, the reservoir being partitioned into active cells of a global cell domain according to the presence of collocated interacting continua in the cells, the partitioned reservoir cells having flow interchange between the continua therein and being assigned global cell numbers, the computer implemented method comprising the steps of:

organizing in the computer a fully coupled nonlinear set of conservation equations with reservoir data of the global cell domain into a full system computation matrix [A], a vector {x} of fluid flow unknowns and a vector {R} of system residuals;

partitioning the full system computation matrix [A] into a [P] matrix containing block diagonal submatrices, inter-continuum block submatrices and vertical intra-continuum submatrices and an [E] matrix containing lateral intra-continuum block submatrices, the active cells of the [P] matrix and the [E] matrix being arranged in an order in which the inter-continuum connections of the cells are located nearest the diagonal of the matrix, and next vertical interporosity continua and next lateral interporosity continua;

linearizing the solution of the fully coupled nonlinear set of conservation equations to obtain simulation values of multiphase flow of the fluids within the cells of the reservoir;

extracting pressure coefficients of the [P] and [E] matrices;

extracting pressure residuals from the system residuals {R};

solving an approximate pressure solution for pressures within active cells of the full system computation matrix [A] by minimizing the extracted pressure residuals;

updating fluid pressures and the full system residuals for the active cells of the computation matrix [A] based on the approximate pressure solution; and solving the full system computation matrix [A] using the fully coupled nonlinear set of conservation equations and the updated system residuals.

2. The computer implemented method of claim 1, further including the steps of:

calculating an approximate full system update for the computation matrix [A] and the updated pressure residuals;

combining the approximate full system update with the updated fluid pressures; and updating the system residuals.

3. The computer implemented method of claim 1, wherein the computer implemented method is performed in a processor having plurality of computer nodes, each comprising a plurality of computer cores operating in parallel, and further including the steps of:

partitioning the input reservoir data for the active cells into a number of parallel data subdomains according to the number of computing cores operating in parallel; and assigning a local cell index to the cells of the received portion of partitioned data subdomains to form parallel data subdomains.

4. The computer implemented method of claim 3, further including the step of:

determining in the processors inter-continua transmissibilities and intra-continua transmissibilities for the assigned global cells of the parallel data subdomains.

5. The computer implemented method of claim 1, wherein the continua comprise multimodal porosity of the formation rock in the active cells.

6. The computer implemented method of claim 5, wherein the multimodal porosity of the formation rock of the active reservoir cells comprises a plurality of porosities and permeabilities.

7. The computer implemented method of claim 5, wherein the multimodal porosity of the formation rock comprises a plurality of porosity modes.

8. The computer implemented method of claim 1, wherein the continua comprise multi-scale fracture networks in the formation rock in the active cells.

9. The computer implemented method of claim 1, wherein the conservation equations comprise material balance equations.

10. The computer implemented method of claim 1, wherein the conservation equations comprise phase saturation balances.

11. The computer implemented method of claim 1, wherein the conservation equations comprise phase equilibrium equations.

12. The computer implemented method of claim 1, further including the step of:

forming an output display of the determined multiphase fluid flow.

13. The computer implemented method of claim 1, further including the step of:

forming a record of the determined multiphase fluid flow.

14. A data processing system for simulation of multiphase flow of fluids within cells of a subterranean reservoir organized into a grid of reservoir cells based on input reservoir data, the reservoir cells having multiple interacting continua in which the multiphase fluid flow takes place, the reservoir being partitioned into active cells of a global cell domain according to the presence of collocated interacting continua in the cells, the partitioned reservoir cells having flow interchange between the continua therein and being assigned global cell numbers, the data processing system comprising:

a processor performing the steps of:

organizing in the computer a fully coupled nonlinear set of conservation equations with reservoir data of the global cell domain into a full system computation matrix [A], a vector {x} of fluid flow unknowns and a vector {R} of system residuals;

partitioning the full system computation matrix [A] into a [P] matrix containing block diagonal submatrices, inter-continuum block submatrices and vertical intra-continuum submatrices and an [E] matrix containing lateral intra-continuum block submatrices, the active cells of the [P] matrix and the [E] matrix being arranged in an order in which the inter-continuum connections of the cells are located nearest the diagonal of the matrix, and next vertical interporosity continua and next lateral interporosity continua;

linearizing the solution of the fully coupled nonlinear set of conservation equations to obtain simulation values of multiphase flow of the fluids within the cells of the reservoir;

extracting pressure coefficients of the [P] and [E] matrices;

extracting pressure residuals from the system residuals {R};

solving an approximate pressure solution for pressures within active cells of the full system computation matrix [A] by minimizing the extracted pressure residuals;

updating fluid pressures and the full system residuals for the active cells of the computation matrix [A] based on the approximate pressure solution; and solving the full system computation matrix [A] using the fully coupled nonlinear set of conservation equations and the updated system residuals.

15. The data processing system of claim 14, wherein the processor further performs the steps of:

calculating an approximate full system update for the computation matrix [A] and the updated full system residuals;

combining the approximate full system update with the updated fluid pressures; and updating the system residuals.

16. The data processing system of claim 14, wherein processor comprises a plurality of computer nodes, each comprising of a plurality of computing cores operating in parallel, and wherein the computing cores perform the steps of:

partitioning the input reservoir data for the active cells into a number of parallel data subdomains according to the number of computing cores operating in parallel; and assigning a local cell index to the cells of the received portion of partitioned data subdomains to form parallel data subdomains.

17. The data processing system of claim 16, further including the parallel computer cores:

determining inter-continua transmissibilities and intra-continua transmissibilities for the assigned global cells of the parallel data subdomains.

18. The data processing system of claim 14, wherein the continua comprise multimodal porosity of the formation rock in the active cells.

19. The data processing system of claim 14, wherein the continua comprise multi-scale fracture networks in the formation rock in the active cells.

20. The data processing system of claim 14, wherein the conservation equations comprise material balance equations.

21. The data processing system of claim 14, wherein the conservation equations comprise phase saturation balances.

22. The data processing system of claim 14, wherein the conservation equations comprise phase equilibrium equations.

23. The data processing system of claim 14, further including:
a work station forming an output display of the determined multiphase fluid flow.

24. The data processing system of claim 14, further including:
data memory storing a record of the determined multiphase fluid flow.

25. A data storage device having stored in a non-transitory computer readable medium computer operable instructions for causing a processor to simulate multiphase flow of fluids within cells of a subterranean reservoir organized into a grid of reservoir cells based on input reservoir data, the reservoir cells having multiple interacting continua in which the multiphase fluid flow takes place, the reservoir being partitioned into active cells of a global cell domain according to the presence of collocated interacting continua in the cells, the partitioned reservoir cells having flow interchange between the continua therein and being assigned global cell numbers, the instructions stored in the data storage device causing the processor to perform the following steps:
organizing in the computer a fully coupled nonlinear set of conservation equations with reservoir data of the global cell domain into a full system computation matrix [A], a vector {x} of fluid flow unknowns and a vector {R} of system residuals;
partitioning the active cells of the full system computation matrix [A] into a [P] matrix containing block diagonal submatrices, intercontinuum block submatrices and vertical intra-continuum submatrices and an [E] matrix containing lateral intra-continuum block submatrices, the active cells of the [P] matrix and the [E] matrix being arranged in an order in which the inter-continuum connections of the cells are located nearest the diagonal of the matrix, and next vertical interporosity continua and next lateral interporosity continua;
linearizing the solution of the fully coupled nonlinear set of conservation equations to obtain simulation values of multiphase flow of the fluids within the cells of the reservoir;
extracting pressure coefficients of the [P] and [E] matrices;
extracting pressure residuals from the system residuals {R};
solving an approximate pressure solution for pressures within active cells of the full system computation matrix [A] by minimizing the extracted pressure residuals;
updating fluid pressures and the full system residuals for the active cells of the computation matrix [A] based on the approximate pressure solution; and
solving the full system computation matrix [A] using the fully coupled nonlinear set of conservation equations and the updated system residuals.

26. The data storage device of claim 25, wherein the instructions further comprise instructions causing the computer node to perform the steps of:
calculating an approximate full system update for the computation matrix [A] and the updated full system residuals;
combining the approximate full system update with the updated fluid pressures; and
updating the system residuals.

27. The data storage device of claim 25, wherein the computer implemented method is performed in a processor having a plurality of computer nodes, each comprising a plurality of computing cores, operating in parallel, and wherein the instructions further comprise instructions causing the computer cores to perform the steps of:
partitioning the input reservoir data for the active cells into a number of parallel data subdomains according to the number of computing cores operating in parallel; and
assigning a local cell index to the cells of the received portion of partitioned data subdomains to form parallel data subdomains.

28. The data storage device of claim 27, wherein the instructions further comprise instructions causing the computer cores to perform the steps of:
determining inter-continua transmissibilities and intra-continua transmissibilities for the assigned global cells of the parallel data subdomains.

29. The data storage device of claim 25, wherein the continua comprise multimodal porosity of the formation rock in the active cells.

30. The data storage device of claim 25, wherein the continua comprise multi-scale fracture networks in the formation rock in the active cells.

31. The data storage device of claim 25, wherein the conservation equations comprise material balance equations.

32. The data storage device of claim 25, wherein the conservation equations comprise phase saturation balances.

33. The data storage device of claim 25, wherein the conservation equations comprise phase equilibrium equations.

34. The data storage device of claim 25, wherein the instructions stored in the data storage device further cause the computer cores to perform the step of:
forming an output display of the determined multiphase fluid flow.

35. The data storage device of claim 26, wherein the instructions stored in the data storage device further cause the computer cores to perform the step of:
forming a record of the determined multiphase fluid flow.

* * * * *